United States Patent
Dubey et al.

(10) Patent No.: US 10,412,024 B2
(45) Date of Patent: Sep. 10, 2019

(54) RESOURCE EVALUATION FOR COMPLEX TASK EXECUTION

(71) Applicant: Accenture Global Solutions Limited, Dublin (IE)

(72) Inventors: Alpana Dubey, Karnataka (IN); Manish Mehta, Milpitas, CA (US); Sakshi Jain, Karnataka (IN); Gurdeep Singh, Karnataka (IN); Alex Kass, Palo Alto, CA (US); Kumar Abhinav, Karnataka (IN)

(73) Assignee: Accenture Global Solutions Limited, Dublin (IE)

( * ) Notice: Subject to any disclaimer, the term of this patent is extended or adjusted under 35 U.S.C. 154(b) by 223 days.

(21) Appl. No.: 15/282,007

(22) Filed: Sep. 30, 2016

(65) Prior Publication Data

US 2017/0359273 A1    Dec. 14, 2017

(30) Foreign Application Priority Data

Jun. 8, 2016   (IN) .............................. 201641019688
Sep. 10, 2016  (IN) .............................. 2016-41019688

(51) Int. Cl.
  *H04L 12/911*  (2013.01)
  *H04L 12/24*   (2006.01)
  *H04L 29/08*   (2006.01)
  *G06Q 10/06*   (2012.01)

(52) U.S. Cl.
  CPC ....... *H04L 47/821* (2013.01); *G06Q 10/0639* (2013.01); *H04L 41/22* (2013.01); *H04L 67/1021* (2013.01); *H04L 47/781* (2013.01)

(58) Field of Classification Search
  CPC .................................................... H04L 47/821
  USPC .......................................................... 709/226
  See application file for complete search history.

(56) References Cited

U.S. PATENT DOCUMENTS

| | | | |
|---|---|---|---|
| 8,694,441 B1 * | 4/2014 | Rothschild ....... | G06Q 10/06398 705/347 |
| 2005/0091098 A1 * | 4/2005 | Brodersen .............. | G06Q 10/06 705/500 |
| 2008/0221910 A1 * | 9/2008 | Au ......................... | G06Q 10/00 705/1.1 |

(Continued)

FOREIGN PATENT DOCUMENTS

WO    WO 2015/089560    6/2015

OTHER PUBLICATIONS

Patent Examination Report No. 2, AU Patent App. No. 2016247051, dated May 10, 2017, pp. 1-5, Australia.

(Continued)

*Primary Examiner* — Sm A Rahman
*Assistant Examiner* — Emad Siddiqi
(74) *Attorney, Agent, or Firm* — Brinks Gilson & Lione

(57) ABSTRACT

The global proliferation of high speed communication networks has created unprecedented opportunities for geographically distributed resource identification, evaluation, selection, and allocation. However, while the opportunities exist and continue to grow, the realization of those opportunities has fallen behind. A dynamic resource assessment system helps to solve the enormous technical challenges of finding the resources, evaluating the resources, and determining how to allocate the resources to achieve the highest likelihood of successfully completing the task.

14 Claims, 18 Drawing Sheets

(56) References Cited

U.S. PATENT DOCUMENTS

2009/0248685 A1* 10/2009 Pasqualoni .......... G06F 16/9535

OTHER PUBLICATIONS

Australia Patent Office, Patent Examination Report No. 4, Australia Patent Application No. 2016247051, dated Dec. 5, 2017, pp. 1-6.
Patent Examination Report No. 3, AU Patent App. No. 2016247051, dated Sep. 7, 2017, pp. 1-6, Australia.
Ambati, V., et al., Towards Task Recommedation in Micro-Task Markets, 2011, pp. 1-4, Carneige Mellon University, Pittsburgh, PA.
Baeza-Yates, R., et al., Modern Information Retrieval, Chapter 10—User Interfaces and Visualization, 1999, pp. 1-103, vol. 463, ACM Press, New York, NY.
Chawla, N.V., et al., SMOTE: Synthetic Miniority Over-sampling Technique, 2002, pp. 321-357, Journal of Artificial Intelligence Research, AI Access Foundation and Morgan Kaufmann Publishers, Burlington, MA.
Chilton, L.B., et al., Task Search in a Human Computation Market, 2010, pp. 1-10, Proceedings of the ACM SIGKDD Workshop on Human Computation, New York, New York.
Difallah, D.E., et al., Pick-A-Crowd: Tell Me What You Like, and I'll Tell You What to Do—A Crowdsourcing Platform of Personalized Human Intelligence Task Assignment Based on Social Networks, 2013, pp. 367-377, International World Wide Web Conference Committee (IW3C2), Rio de Janeiro, Brazil.
Hall, M., et al., The WEKA Data Mining Software: An Update, 2009, pp. 10-18, vol. 11, Issue 1, ACM SIGKDD Explorations Newsletter, The Association for Computing Machinery (ACM), New York, NY.
Horton, J., et al., Reputation Inflation in an Online Marketplace, Feb. 16, 2015, pp. 1-31, New York University, New York, NY.
Mao, K., et al., Developer Recommendation for Crowdsourced Software Development Tasks, 2015, pp. 347-356, 2015 IDD Symposium on Service-Oriented Engineering (SOSE), IEEE Computer Society, Washington, D.C.
Safran, M., et al., Real-time recommendation algorithms for crowdsourcing systems, Jan. 2, 2016, pp. 1-18, Applied Computing and Informatics, Saudi Arabia.
Sarasua, C., et al., Microtask available, send us your CVI, 2013, pp. 1-4, Insitutute for Web Science and Technologies (WeST), Germany.
Schnitzer, S., et al., Perceived Task Similarities for Task Recommendation in Crowdsourcing Systems, 2016, pp. 585-590, Proceedings of the $25^{th}$ International Conference Companion on World Wide Web, International World Wide Web Conferences Steering Committee, Montreal, Canada.
Schnitzer, S., et al., Demands on task recommendation in crowdsourcing platforms—the worker's perspective, Sep. 19, 2015, pp. 1-6, CrowdRec Workshop, Vienna, Austria.
Sekiguchi, T., Person-Organization Fit and Person-Job Fit in Employee Selection: A Review of the Literature, Mar. 2004, pp. 179-196, vol. 54, No. 6, Osaka Keidal Ronshu, Osaka, Japan.
Yuen, M-C., et al., Task Matching in Crowdsourcing, 2011, pp. 409-412, 2011 IEEE International Conference on Internet of Things, and Cyber, Physical and Social Computing, IEEE Computer Society, Washington, D.C.
Yuen, M-C., et al., Task Recommendation in Crowdsourcing Systems, Aug. 12, 2012, pp. 1-5, CrowdKDD'12, Beijing, China.
Australia Patent Office, Patent Examination Report No. 1, Australia Patent Application No. 2017272252, dated Feb. 1, 2019, 5 pages.

* cited by examiner

Resource Details

Overview

Rohit
Ludhiana,India
UTC+05:30 Mumbai, Kolkata, Chennai, New Delhi
Billing Rate $19
Score 13.58   Rank ②

Java,Spring,AngularJS,Apache POI, MongoDB, My Sql, Sql Server......

I have 8+ years experience in java/JEE Developer/Tech Lead/Architect. I am having expertise on Core Java, J2EE, Multithreading, Spring MVC, Struts 1.2/2.0, Hibernate/JPA, Web Services, XML, AJAX, JSON, AngularJS, ExtJS, JQuery,HTML5, CSS3, javascript, JSP, Servlet, JSTL, Tiles, MySQL,Oracle, Patterns: programsji

Educational Highlights

| School | : University of Virginia |
| Area | : Software Engineering |
| Degree | : Masters |
| From Date | : 1/1/1994 |
| To Date | : 1/1/1996 |

Career Highlights

SKILL — Java Certified Professional

SPECIAL — 2014

Profile Summary  906

- Total projects ⑬
- Projects completed successfully ⑬
- Ongoing projects ②
- Projects Completion Rate 100%
- Past rating ☆☆☆☆

Ranking among Candidates  908

- ✧ 1st Ranked number 2
- ▦ System Score of 13.58
- ✧ Has task similarity score of 1
- ✓ With 0.25 matching skills
- ✓ Currently Available
- ⚖ Client Similarity score is 2
- ✓ Has matching time zone
- ⊕ Collaboration Score null

---

Skill Fitness | Similar Tasks | Resume | Past Tasks | Ongoing Tasks | Recent Reviews | Summary

Skills
- ☑ c #
- ☑ java
- ☑ spring-framework
- ☑ javascript
- ☐ jsp
- ☐ angularjs
- ☐ jdbc ☐ Required skill  ☐ Profile skill  [Refresh]

910
- ○ ☐ C#
- ○ ☑ java
- ○ ☐ spring-framework
- ○ ☑ javascript

Task taken in the each skill

912
Task Taken v/s Successful
(January, February, March, April, May, June, July)
○ ☐ Task Taken
● ☐ Task Completed

Figure 9

| Skill Fitness | Similar Tasks | Resume | Past Tasks | Ongoing Tasks | Recent Reviews | Summary |

Java Spring Web Developer Position (Part-Time, Work Remotely) — Completed

We are a software development house focused on building B2B web app's. Our upcoming project is a mobile + web application which will track users location users GPS for various purposes. Client and Server will be cleanly separated, with the client only communicating to the back-end via APIs following the REST specification. We require an experienced java back-end web developer, skilled at the following technologies/frameworks/methodologies: -- Critical skill sets (MUST-HAVES) -- java + Spring Framework + Strong understanding of MVC pattern - Spring Boot - Spring Security - Spring Data JPA - Hibernate ORM - My SQL DB usage & management - REST web development pattern (proper use of GET/POST/PATCH/ect) - Writing APIs for Single Page Applications built on Javascript frameworks like AngularJS, EmberJS, etc - Git for versioning -- Other Important skill sets   More

Skills : *core-java,hibernate,html,javascript,node.js,spring-framework,website-development,*

Date : 8/5/2015 to 1/25/2016

Feedback : ★★★★★

Comment :

Figure 11

| Skill Fitness | Similar Tasks | Resume | Past Tasks | Ongoing Tasks | Recent Reviews | Summary |

1402

Programming Snippets for Education Startup — Completed

We are a education startup based in London, UK. You can demo our product at http://www.codebashing.com/sql_demo What we are looking for ? Our requirement is very simple: 1. We will provide you with 20 code snippets written in Java 2. These code snippets are maximum 20-25 lines each and the code sample shows a software security bug. - We would like you to convert thes 20 code snippets into: - SPRING MVC code snippets - GO code snippets - PLAY Framework code snippets - We would also require for these 20 code snippets a security fix. - In short, we require 20 code snippets showing the bug (vulnerable code snippets), and 20 code snippets showing the correct fixes (fixed code snippets) - The best way to understand what we are after is to see our demo at http://www.codebashing.com/sql_demo    More

Skills Required: *null*

Update Existing Java command line tool latest Smartsheet API — Completed

Looking for a Java and API expert to upgrade our existing Java command line tool Backup Utility from Smartsheet API 1.1 to API 2.0. Candidate will need to be an expert in Java and APIs (specifically REST with JSON). Backup Utility: https://github.com/smartsheet-platform/backup-java API Documentation: http://smartsheet-platform.github.io/api-docs/    More

Skills Required: *json,rest*

1400

Figure 14

# RESOURCE EVALUATION FOR COMPLEX TASK EXECUTION

PRIORITY CLAIM

This application claims priority to Indian non-provisional application serial number 201641019688, filed 10 Sep. 2016 and to Indian provisional application serial number 201641019688, filed 8 Jun. 2016.

TECHNICAL FIELD

This application relates to a technical evaluation of resources to carry out complex tasks.

BACKGROUND

The global proliferation of high speed communication networks has created unprecedented opportunities for geographically distributed resource identification, evaluation, selection, and allocation. However, while the opportunities exist and continue to grow, the realization of those opportunities has fallen behind. In part, this is due to the enormous technical challenges of finding the resources, evaluating the resources, and determining how to allocate the resources to achieve the highest likelihood of successfully completing the task.

BRIEF DESCRIPTION OF THE DRAWINGS

FIG. 9 shows an example resource detail interface.

FIG. 11 shows an example similar task analysis interface.

FIG. 14 shows an example prior task analysis interface.

DETAILED DESCRIPTION

Finding, evaluating, and applying the right set of resources to a complex task is a key to successful task execution and completion. The dynamic resource analysis machine ("DRAM") described below implements a technical multi-dimensional assessment system for resources, performs complex assessments of the resources, and defines and generates improved machine interfaces that deliver the assessments, e.g., for consideration and possible selection of a resource. The DRAM may perform the complex assessments on a wide range of resource types for any type of task. A few examples of resource types include: software programs; trained and untrained machine learning models; artificial intelligence engines; robots; machines; tools; mechanical, chemical, and electrical equipment, database models; machines; individual workers with specific skills; and mechanical, chemical, or electrical components. A few examples of tasks include: deploying cloud infrastructure; building a web site; building an oil rig; performing legal services; creating a new software application; architecting and building an office, factory, or school; or designing, simulating, prototyping, and manufacturing high performance analog or digital circuitry.

The DRAM may be implemented using any set of dimensions and metrics organized into a multi-dimensional analysis framework that is suitable for the resources in question. For instance, a tailored set of analysis dimensions may be present for chemical or electrical component selection, and those dimensions may be very different form the dimensions in place for assessing workers. As one specific example, while the DRAM may measure timezone match, education compensation goals, or cultural matches for workers, the DRAM may instead measure component tolerance, number of suppliers, cost of materials handling, or other metrics for chemical, electrical, or other resources. For purposes of explanation, the discussion below concerns one possible set of dimensions for worker assessment, but the dimensions and metrics may change in any degree needed to suit the resource and tasks in question.

Figure 1:
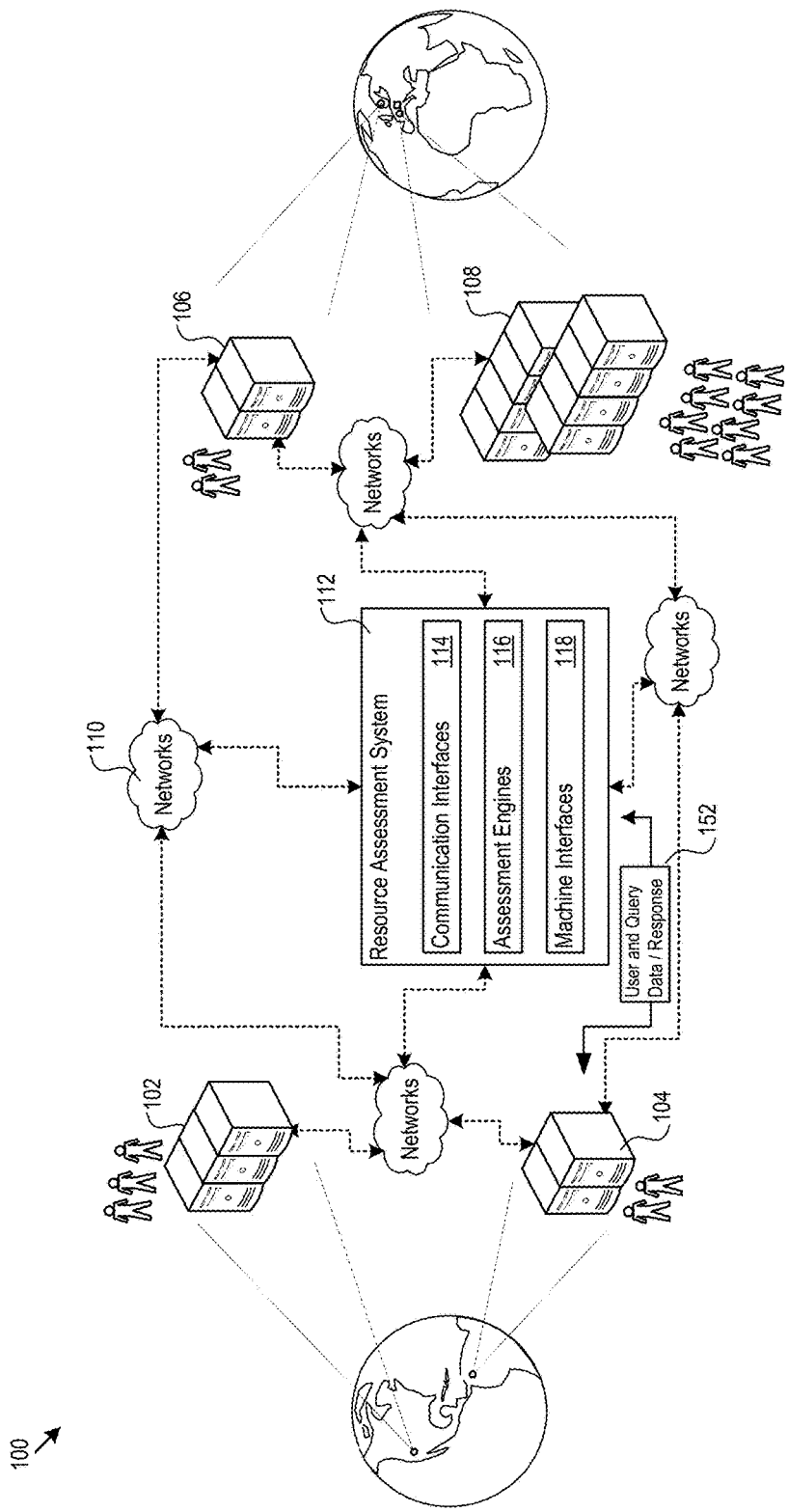
FIG. 1 shows a global network architecture.
Figure 2:
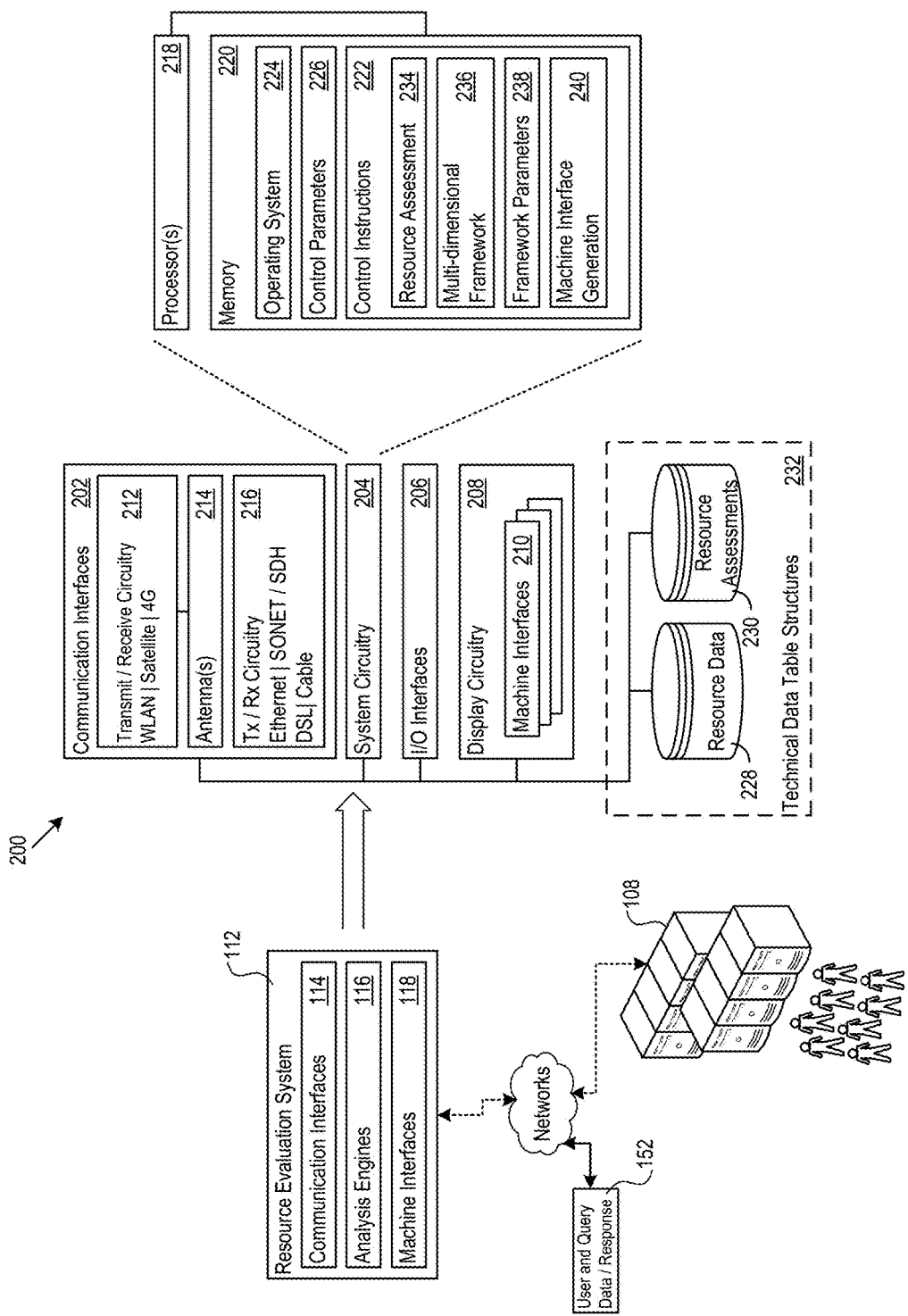
FIG. 2 shows an example implementation of a resource analysis system.

FIGS. 1 and 2 provide an example context for the discussion below of the technical solutions in the DRAM. The examples in FIGS. 1 and 2 show one of many possible different implementation contexts. In that respect, the technical solutions are not limited in their application to the architectures and systems shown in FIGS. 1 and 2, but are applicable to many other system implementations, architectures, and connectivity.

FIG. 1 shows a global network architecture 100. Connected through the global network architecture 100 are geographically distributed data platforms 102, 104, 106, and 108. The data platforms 102-108 provide resource characteristic data on any number or type of available resources.

Throughout the global network architecture 100 are networks, e.g., the network 110. The networks provide connectivity between the data platforms 102-108 and the DRAM 112. The networks 110 may include private and public networks defined over any pre-determined and possibly dynamic internet protocol (IP) address ranges.

The DRAM 112 performs complex technical resource assessments. As an overview, the DRAM 112 may include communication interfaces 114, assessment engines 116, and machine interfaces 118. The communication interfaces 114 connect the DRAM 112 to the networks 110 and the data platforms 102-108, and facilitate data exchange 152, including exchanging resource characteristic data, and the delivery of machine interfaces (which may include Graphical User Interfaces (GUIs)) for improved interaction with the DRAM 112 regarding the assessments.

FIG. 2 shows an example implementation 200 of the DRAM 112. The DRAM 112 includes communication interfaces 202, system circuitry 204, input/output (I/O) interfaces 206, and display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality in the DRAM 112, including the assessment engines 116. As just one example, the system circuitry 204 may include one or more instruction processors 218 and memories 220. The memory 220 stores, for example, control instructions 222 and an operating system 224. In one implementation, the processor 218 executes the control instructions 222 and the operating system 224 to carry out any desired functionality for the DRAM 112. The control parameters 226 provide and specify configuration and operating options for the control instructions 222, operating system 224, and other functionality of the DRAM 112.

The DRAM 112 may include technical data table structures 232 hosted on volume storage devices, e.g., hard disk drives (HDDs) and solid state disk drives (SDDs). The storage devices may define and store database table structures that the control instructions 222 access, e.g., through a database control system, to perform the functionality implemented in the control instructions 222.

In the example shown in FIG. 2, the databases store resource characteristic data 228, completed resource assessments 230, and other data elements supporting the multi-dimensional analysis described below. Any of the databases may be part of a single database structure, and, more generally, may be implemented as data stores logically or physically in many different ways. As one example, the data table structures 232 may be databases tables storing records that the control instructions 222 read, write, delete, and modify in connection with performing the multi-dimensional processing noted below.

In one implementation, the control instructions 222 include resource analysis instructions 234. The resource assessment instructions 234 execute resource assessment according to a multi-dimensional assessment framework 236 and according to pre-determined fixed or dynamic framework parameters 238 (e.g., weighting factors). Further, the control instructions 222 include machine interface generation instructions 240 that generate machine interfaces, including GUIs, that achieve improved interaction with the DRAM 112 regarding the assessments.

The data table structures 232, resource assessment instructions 234, multi-dimensional assessment framework 236, framework parameters 238, and machine interface generation instructions 240 improve the functioning of the underlying computer hardware itself. That is, these features (among others described below) are specific improvements in way that the underlying system operates. The improvements facilitate more efficient, accurate, and precise execution of complex resource analysis.

Figure 3:
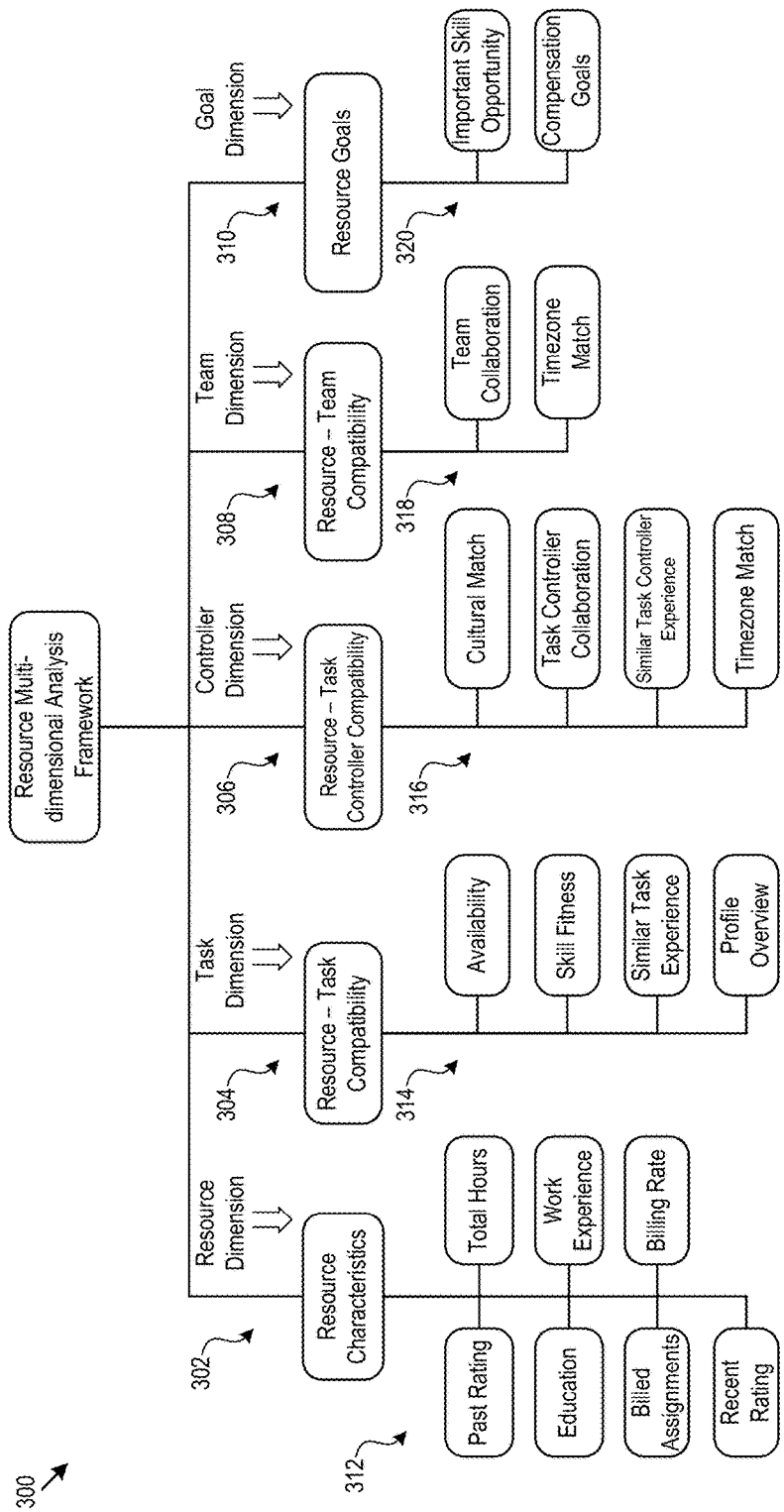
FIG. 3 shows one example of a multi-dimensional analysis framework that the resource analysis system may implement.
Figure 4:
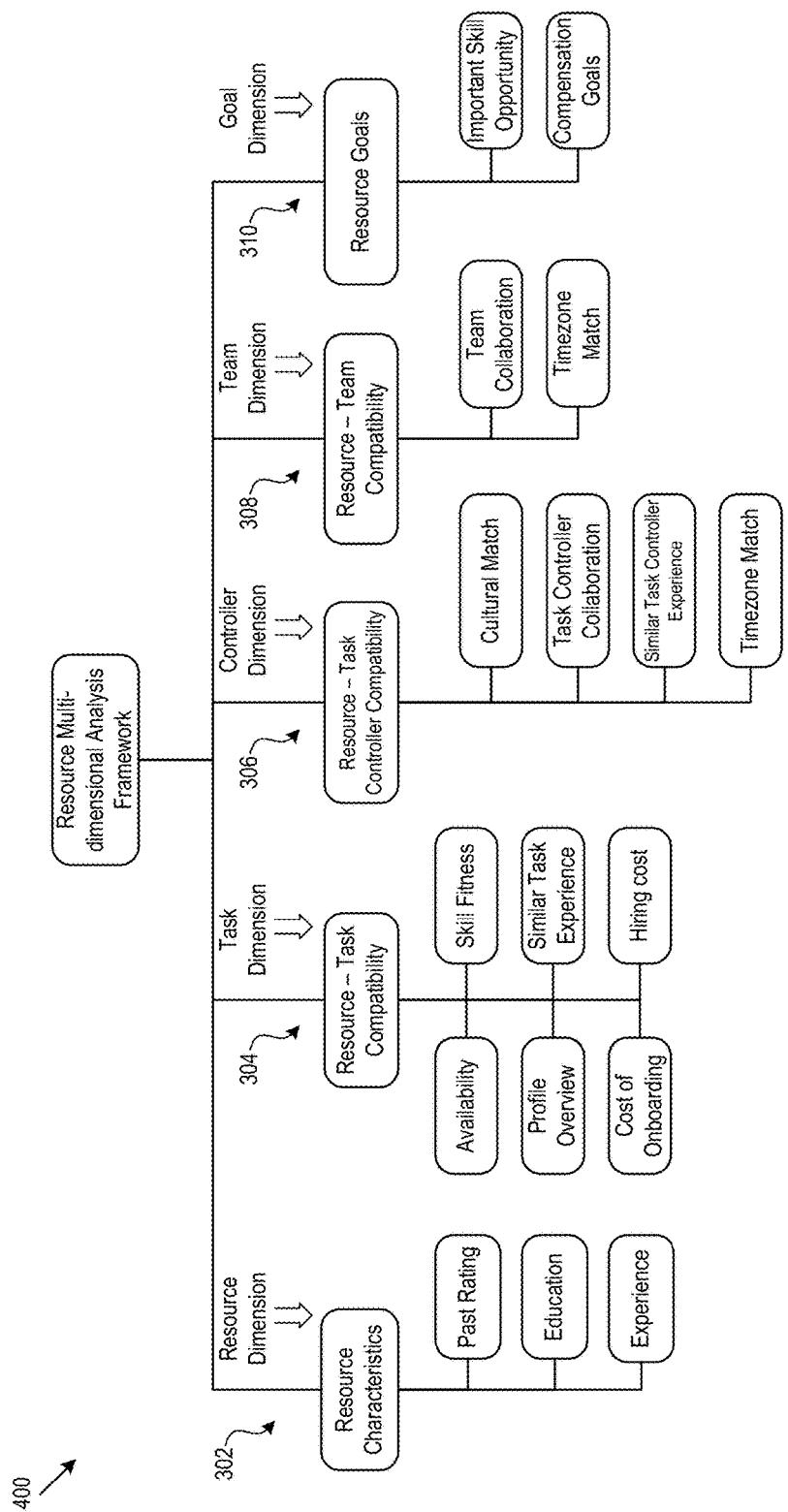
FIG. 4 shows another example of a multi-dimensional analysis framework that the resource analysis system may implement.
Figure 5:
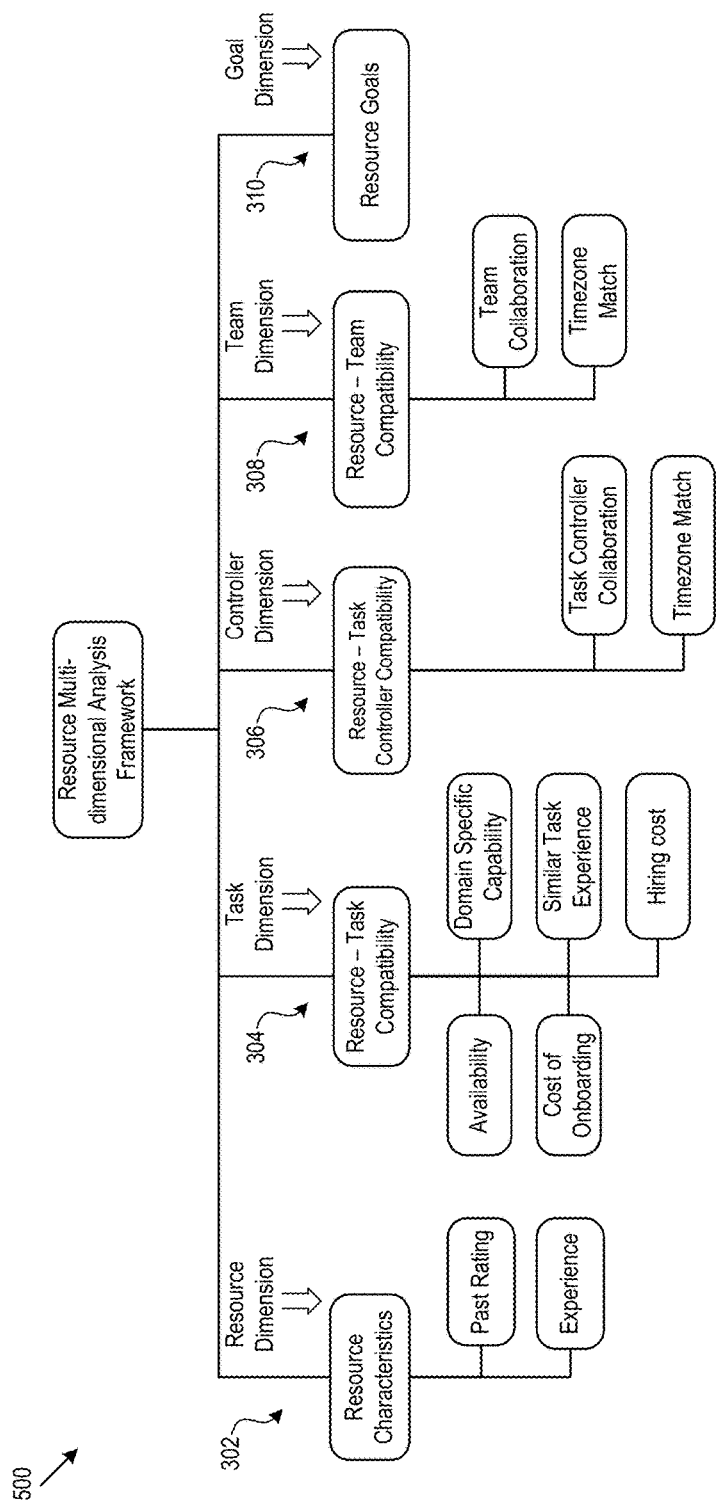
FIG. 5 shows another example of a multi-dimensional analysis framework that the resource analysis system may implement.

FIGS. 3-5 show example implementations 300, 400, 500 of the multi-dimensional assessment framework 236. The multi-dimensional assessment framework 236 may take a very wide range of implementations, including additional, fewer, or different dimensions and dimensional characteristics to evaluate. The example implementation 300, for instance, includes a resource dimension 302, a task dimension 304, a controller dimension 306, a team dimension 308, and a goal dimension 310.

The resource dimension 302 includes resource specific characteristics 312. The resource specific characteristics 312 typically provide data on the individual performance of the resource itself. Examples are given below in Table 1.

TABLE 1

Resource Dimension

| Dimensional Characteristics | Examples |
|---|---|
| Past Rating | numerical rating on prior tasks completed more than a threshold amount of time ago |
| Recent Rating | numerical rating on prior tasks completed less than a threshold amount of time ago |
| Hours of Experience | length of time the resource has been working on tasks |
| Education | specific skills, degrees, training, or other capability indicators possessed by the resource |
| Work Experience | specific types and characteristics of tasks previously performs; specific roles filled by the resource |
| Billed Assignments | the number of prior tasks for which the resource submitted an invoice |
| Cost | purchase and maintenance costs, rental rates, billing rates |

The task dimension 304 includes resource-task compatibility characteristics 314. The resource-task compatibility characteristics 314 typically provide data on how well the resource is suited for the posted task. Examples are given below in Table 2.

TABLE 2

Task Dimension

| Dimensional Characteristics | Examples |
|---|---|
| Availability | whether or not a resource is available for the posted task; the DRAM 112 may derive this metric from information about other tasks (e.g., duration, start, and termination data) to which the resource is assigned |

TABLE 2-continued

Task Dimension

| Dimensional Characteristics | Examples |
|---|---|
| Skill Fitness | data reflecting whether the resource has the ability to perform a particular task; e.g., whether the skills or capabilities possessed by the resource match task requirement descriptors; the DRAM 112 may take this data from the profile description of the resource, may extract the data from descriptions of prior tasks completed, or may obtain the data from other sources.<br>The Skill Fitness score may also take into account resource test scores, e.g., if the resource has been measured against any given test of skills. |
| Similar Task Experience | The prior experience of a resource demonstrates knowledge, skills and ability to do various types of tasks. Also, resources may be better adapted to working on tasks similar to prior tasks. As such, the DRAM 112 may evaluate resource experience on similar tasks when making its evaluation. Further details are provided below. |
| Profile Overview | This metric provides an assessment of resource competency to perform a task based on a profile overview of the resource. The resource profile may include a description about the resource, prior tasks in academia or industry, and other information. In that regard, the resource profile may demonstrate work history and how likely the resource is to fit the task requirements. The DRAM 112 may implement a content matching approach such as that described in *Modern Information Retrieval*, Volume 463, ACM press New York, 1999 to find similarity between the resource profile and the task description. |

As one example, the DRAM 112 may determine the Skill Fitness metric according to:

$$\text{Skill\_Fitness}(S_t, S_w) = \frac{\text{Match}(S_t, S_w)}{|S_t|} + \sum_{\forall S_t} T_s * T_p$$

where $S_t$ is the set of skills required for a task, $S_w$ is the set of skills possessed by the resource, $T_s$ is the Test score and $T_p$ is the Test percentile. Match $(S_t, S_w)$ computes the number of matched skills between $S_t$ and $S_w$ and $|S_t|$ is the total number of skills required by the task.

As one example, the DRAM 112 may determine the Similar Task Experience metric in the following manner. The DRAM represents the task, 't', as a tuple $<T_t, D_t, St, Du_t, R_t>$ where $T_t$ is title of the task, $D_t$ is description of the task, $S_t$ is skills required for the task, $Du_t$ is duration of the task, $R_t$ is rating received by the resource on task completion. Let $t_p<Tt_p, Dt_p, St_p, Du_{tp}>$ be the posted task and $t_h$ ($t_h \in T_h$, where $T_h$ is set of tasks completed by the resource in the past)$<Tt_h, Dt_h, St_h, Dut_h, Rt_h>$ be a past task performed by the resource in past.

Experience on a similar task does not necessarily ensure better performance by the resource. Therefore, to evaluate similarity between two tasks, the DRAM 112 may use a rating Rt. In that regard, the DRAM 112 may carry out the processing for calculating task similarity described in Algorithm 1. Note that the DRAM 112 evaluates both structured (e.g., explicitly defined task categories) and unstructured information (e.g., free form resource profile text descriptions) about the tasks to identify similar tasks, thus capturing task similarity with more accuracy.

Algorithm 1
Task Similarity

Input: $t_p$ and $T_h$
Output: Task similarity score $T_s$
$\forall t_h \in T_h$, compute the similarity between $t_h$ and $t_p$ by following below steps:
1. Tokenize the title and description of tasks $t_p$ and $t_h$
2. Remove the stop words (most common words) and perform stemming
3. Calculate TF-IDF (Term frequency-Inverse document frequency) weight for each token
4. Compute the cosine similarity between title of $t_p$ and $t_h$; and description of $t_p$ and $t_h$ $$\cos\_sim(T_{t_h}, T_{t_p}) = \frac{\vec{T}_{t_h} \cdot \vec{T}_{t_p}}{\|T_{t_h}\| \cdot \|T_{t_p}\|}$$

$$\cos\_sim(D_{t_h}, D_{t_p}) = \frac{\vec{D}_{t_h} \cdot \vec{D}_{t_p}}{\|D_{t_h}\| \cdot \|D_{t_p}\|}$$

5. Calculate the skill similarity as:

$$\text{Skill\_similarity}(t_h, t_p) = \frac{(S_{t_h} \cap S_{t_p})}{S_{t_p}}$$

6. Compute similarity between Duration of $t_p$ and $t_h$ as:
   DurationI_sim $(t_h, t_p) = (Du_{t_h} == Du_{t_p})$ ? 1 : 0
7. Calculate Task similarity score $T_s$ as:
   $T_s = (\text{Skill\_similarity}(t_h, t_p) + \cos\_sim(T_{t_h}, T_{t_p}) + \cos\_sim(T_{t_h}, T_{t_p}) + \text{Duration\_sim}(t_h, t_p)) \times R_t$ The controller dimension 306 includes resource-task controller compatibility characteristics 316. The resource-task controller compatibility characteristics 316 typically provide data on how compatible the resource will be with the task controller (e.g., an individual who posted the task). For this compatibility measure, the DRAM 112 may measure parameters such as, e.g., tasks completed by the resource for the task controller and overlapping working hours between the task controller and the resource. In one implementation, the DRAM 112 evaluates the metrics shown in Table 3 to measure this compatibility.

TABLE 3

Controller Dimension

| Dimensional Characteristics | Examples |
|---|---|
| Cultural Match | The DRAM 112 may define cultural matching of a resource to a task controller in terms of values, norms, assumptions, interaction with resources, and the like. The DRAM 112 may evaluate the cultural match when, e.g., resources belong to different geographies and use different languages in order to perform a posted task. This metric assesses how well a task controller of one country ($C_{tp}$) collaborates with a resource from another country ($C_w$). This metric may also capture preference of a task controller to work with a resource in a particular country. The DRAM 112 may evaluate, e.g., Jaccard similarity to measure the association between the two, e.g.,:<br><br>$$\text{Cultural\_Match}(C_{tp}, C_w) = \frac{C_{tp} \cap C_w}{C_{tp} \cup C_w}$$ |
| Task Controller Collaboration | The DRAM 112 may determine the extent to which the resource has collaborated with the task controller (tp) from past assignments of the resource (cw). If a resource has collaborated well with a task controller in past, the task controller may feel more confident selecting the resource again. The DRAM 112 may evaluate task controller collaboration according to, e.g.: |

TABLE 3-continued

Controller Dimension

| Dimensional Characteristics | Examples |
|---|---|
| | $$\text{Collaboration\_Score}(tp, cw) = \frac{\sum_{i=1}^{N} \text{Rating}_i}{N}$$ where N is the total number of tasks for which cw has collaborated with tp and $\text{Rating}_i$ is the feedback score given to cw by tp upon task completion. |
| Similar Task Controller Experience | A resource may not have worked directly with the task controller before, but may have worked with similar task controllers. Using this metric, the DRAM 112 identifies similarities between task controller of the posted task tpp, and the task controllers with which the resource has worked in the past TPh. That is, this metric measures how well the resource has worked with similar task controllers in past.<br>The DRAM 112 may define the task controller tp as a tuple <feedback score, hiring rate, past hires, total hours worked, and total assignments>. The DRAM 112 may use a measure such as Euclidean Distance (ED) to evaluate the similarity, e.g.:<br>TaskPoster_Similarity<br>$(tp_p, tp_h) = \max(ED(tp_h, tp_p)); \forall tp_h \in TP_h$<br>The DRAM 112 may also evaluate cosine similarity to determine similarity between the task controller of the present task, and the other task controllers that the resource has worked for:<br>Input: $c_p$, $C_m$ // $c_p$ is the information about the task controller and $C_m$, is the list of task controllers who previously worked with the resource<br>Output: Similar controller experience score.<br>Steps:<br>Step 1: Compute the cosine similarity between $c_p$ and all the controllers $c_m$ in $C_m$. The similarity may be computed based on feedback score, hiring rate, past hires, total hours worked, and total assignments.<br>Step 2: Determine the similar controller experience score as follows:<br>Similarity_client_experience_score =<br>$\max (\forall c_m \in C_m, (\text{cosine\_similarity}(c_p, c_m))$<br>The above metric measures how well the resource has worked with similar task controllers in the past. The metric helps the DRAM 112 understand and build confidence in the task controller for the resource, e.g., when the task controller does not have prior experience working with the resource. |
| Timezone Match | Resources from different geographies and time zones come together to perform a task. The DRAM 112 may measure compatibility of resources from different time zones with that of the task controller. For instance, the DRAM 112 may measure how many working hours of the task controller overlap with the working hours of the resource. |

The team dimension 308 includes resource-team compatibility characteristics 318. The resource-team compatibility characteristics 318 typically provide data on how compatible the resource will be with a team of other resources selected for the task. In one implementation, the DRAM 112 evaluates the metrics shown in Table 4 to measure this compatibility.

TABLE 4

Team Dimension

| Dimensional Characteristics | Examples |
|---|---|
| Team Collaboration | The DRAM 112 may measure compatibility with the level of collaboration among the task team members. High collaboration among team members may lead to better performance of the resource. The DRAM 112 may evaluate the team collaboration score based on the collaboration of the resource with team members, if they have worked together on any task in past.<br>The DRAM 112 may evaluate resource-team compatibility according to, e.g.,:<br>$$\text{Team\_Collaboration}(w, \text{team}) = \frac{1}{n}\sum_{i=1}^{n}\left(\frac{\sum_{j=1}^{N}\text{Rating}_{ij}}{N}\right)$$ where n is the total number of resources that part of a team, N is the total number of tasks in which resource w has collaborated with $w_i$ ($w_i \in$ team) and $\text{Rating}_{ij}$ is the feedback score received by resource w in collaboration with $w_i$ on task tj. |
| Timezone Match | In a globally distributed task, resources from different time zones work together on interdependent tasks. Hence, the DRAM 112 may measure the compatibility of the time zone of one resource with other team members the resource will collaborate with to complete the task. Team members having overlapping time zones are likely to collaborate better. |

The goal dimension 310 captures intrinsic and extrinsic forces which drive a resource to accomplish a task. Those forces may vary depending on the type of resource, and may include, as examples, opportunity to learn new skills, domains, career growth, compensation, and other forces. The DRAM 112 determine whether the attributes of a task fulfill a goal or match a motivation of a resource. Table 5 provides some example characteristics the DRAM 112 may analyze in this regard.

TABLE 5

Goal Dimension

| Dimensional Characteristics | Examples |
|---|---|
| Important Skill Opportunity | Resources may have goals to learn what they deem important skills. This metrics captures whether the task gives a resource an opportunity to learn those skills. In one implementation, the DRAM 112 determines whether the task provides an opportunity to learn skills that are of high demand in the marketplace and are high paying. The DRAM 112 may follow, e.g., Algorithm 2 to identify important skills. |

TABLE 5-continued

Goal Dimension

| Dimensional Characteristics | Examples |
|---|---|
| Compensation Goals | The DRAM 112 may evaluate whether the resource may, e.g.: obtain a better monetary payoff for a task, increase in skill level by performing the task (e.g., from Beginner to Intermediate, or from Intermediate to Expert), or meet other compensation goals. The DRAM 112 may evaluate this metric with reference to, e.g., expected compensation (e.g., payoff) for each skill required by the task, and the expectation expressed by the resource for that skill. For instance, the DRAM 112 may define an expected payoff as the difference in average pay offered for the skill level required for the task and the average compensation expected by the resource for those skills at the level possessed by the resource. This differential may drive a further determination of monetary goals for the resource as shown below:<br>ExpectedPayDif f (Skill, $l_t$, $l_w$) = AveragePay(Skill, $l_t$) − AveragePay (Skill, $l_w$)<br>MontearyMotivation = Average (ExpectedPayDiff (Skill, $l_t$, $l_w$)); $\forall$Skill $\in S_t$<br>where $l_t$ is the skill level required for the task and $l_w$ is the skill level possessed by resource. |

Algorithm 2
Important Skill Identification

Input: All task data $T_m$ from the marketplace, skills required for the posted task $S_{t_p}$ and skillset of the resource $S_w$.
Output: GoalSkill Opportunity GS
1. Rank all the skills listed in tasks Tm based on the percentage of tasks requiring them, average pay given for the task requiring those skills and percentage of resources possessing those skills. Order skills in the descending order along these to identify the goalskills
2. Calculate the percentile score for each skill based on their rank. Percentile (Skill) = $(N_s - R_s)/(N_s)$
where $N_s$ is the total number of skills available in a field and $R_s$ is the rank of a particular skill.
3. Calculate GoalSkill opportunity for resource as:

$$GS(w) = \frac{\sum_{\forall Skill \in S_t \,\&\, Skill \notin S_w} Percentile(Skill)}{|Skill \in S_t \,\&\, Skill \notin S_w|}$$

Analysis using Random Forest provides indicators of importance of the metrics discussed above. Table 6, below, shows one analysis in terms of information gain for ranking importance of each dimension in the multi-dimensional analysis. That is, Table 6 shows the top metrics for making a likely successful resource selection decision, with the metrics are ranked in decreasing order of Information gain. The DRAM 112 may, for instance, give greater weight to these metrics than others when determining an overall evaluation for a potential resource.

TABLE 6

Dimensional Importance

| Metric | Information Gain |
|---|---|
| Similar Task Experience | 0.96 |
| Skill Fitness | 0.675 |
| Cultural Match | 0.616 |
| Billed Assignments | 0.612 |
| Billing Rate | 0.602 |
| Task Controller Collaboration | 0.552 |

Figure 6:
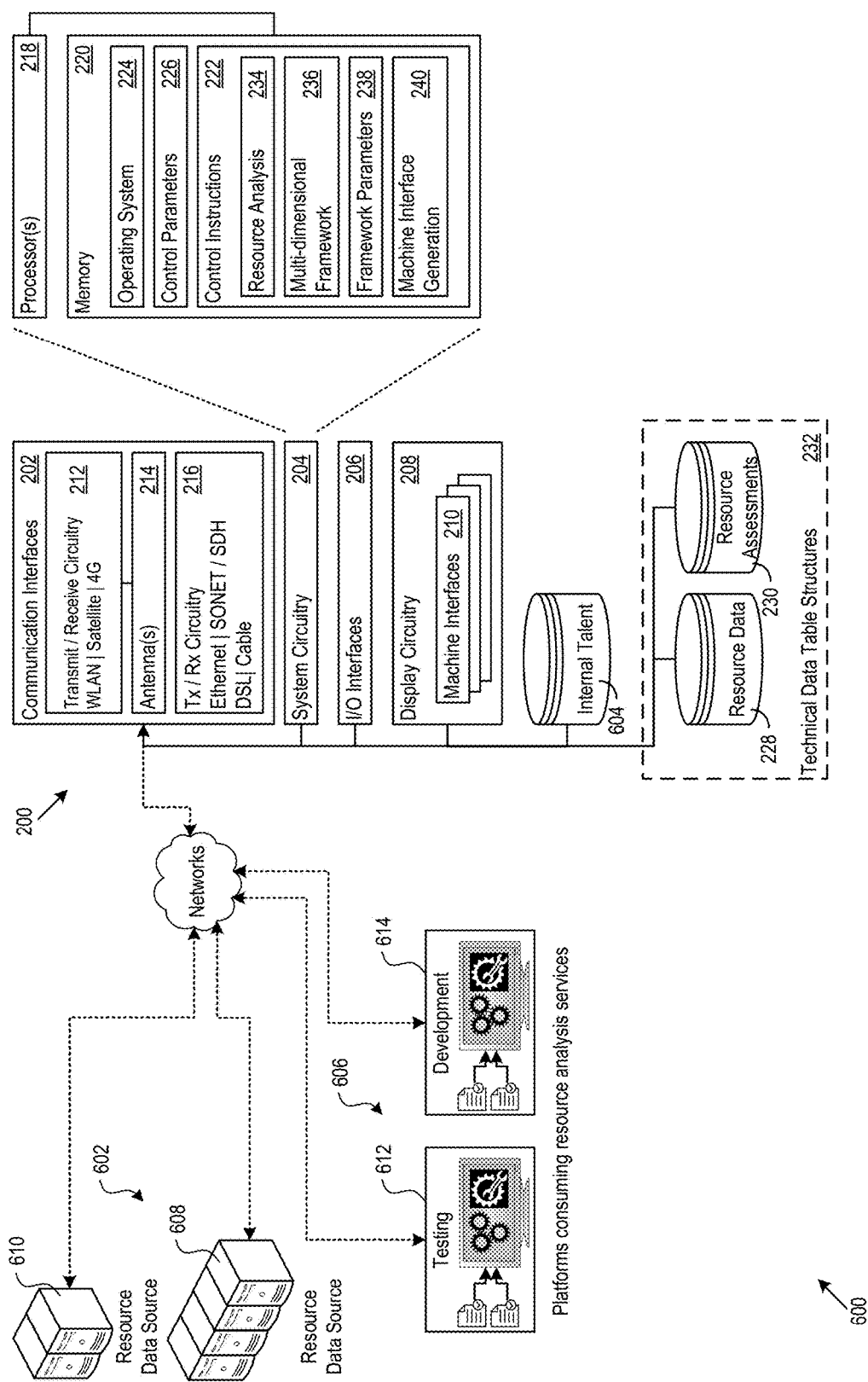
FIG. 6 shows the resource analysis system in communication with sources of resource data, and with platforms that consume resource analysis services.

FIG. 6 shows a system environment 600 in which the DRAM 112 communicates with sources 602, 604 of resource data, and with platforms 606 that consume resource analysis services. The sources 602, 604 may provide any of the data described above to the DRAM 112 for analysis, e.g., identifications of available resources, resource profiles, reviews, test scores, prior task experience, cost, time zone, and other data. The sources 602 are external to the DRAM 112, and in this example include crowd sourcing systems Upwork 608 and Applause 610. The source 604 is internal to the organization hosting the DRAM 112, and may be an internal talent database or knowledge exchange, as just two examples. In other implementations, the source 604 and the DRAM 112 are present in or implemented by physically separate systems. That is, the source 604 and DRAM 112 may be independent, with, for instance, the source 604 internal to an enterprise, and the enterprise connecting to the DRAM 112 for performing the resource analysis.

The platforms 606 connect to the DRAM 112, e.g., via resource assessment machine interfaces 210, application programming interface (API) calls defined by the DRAM 112, and the like. The platforms 606 may access the DRAM 112 as a service for resource evaluation, e.g., to find resources for a testing environment 612 that performs testing tasks (e.g., software testing), or for a development environment 614 that performs development tasks (e.g., software development). The DRAM 112 receives task posting data from any source, performs the requested analyses on available resources against the task postings, and returns responses with evaluations to the platforms 606. In that regard, the DRAM 112 may render and deliver any number of predefined machine interfaces 210 to the platforms 606, e.g., as GUIs in a web browser. A few examples of the machine interfaces 210 follow.

Figure 7:
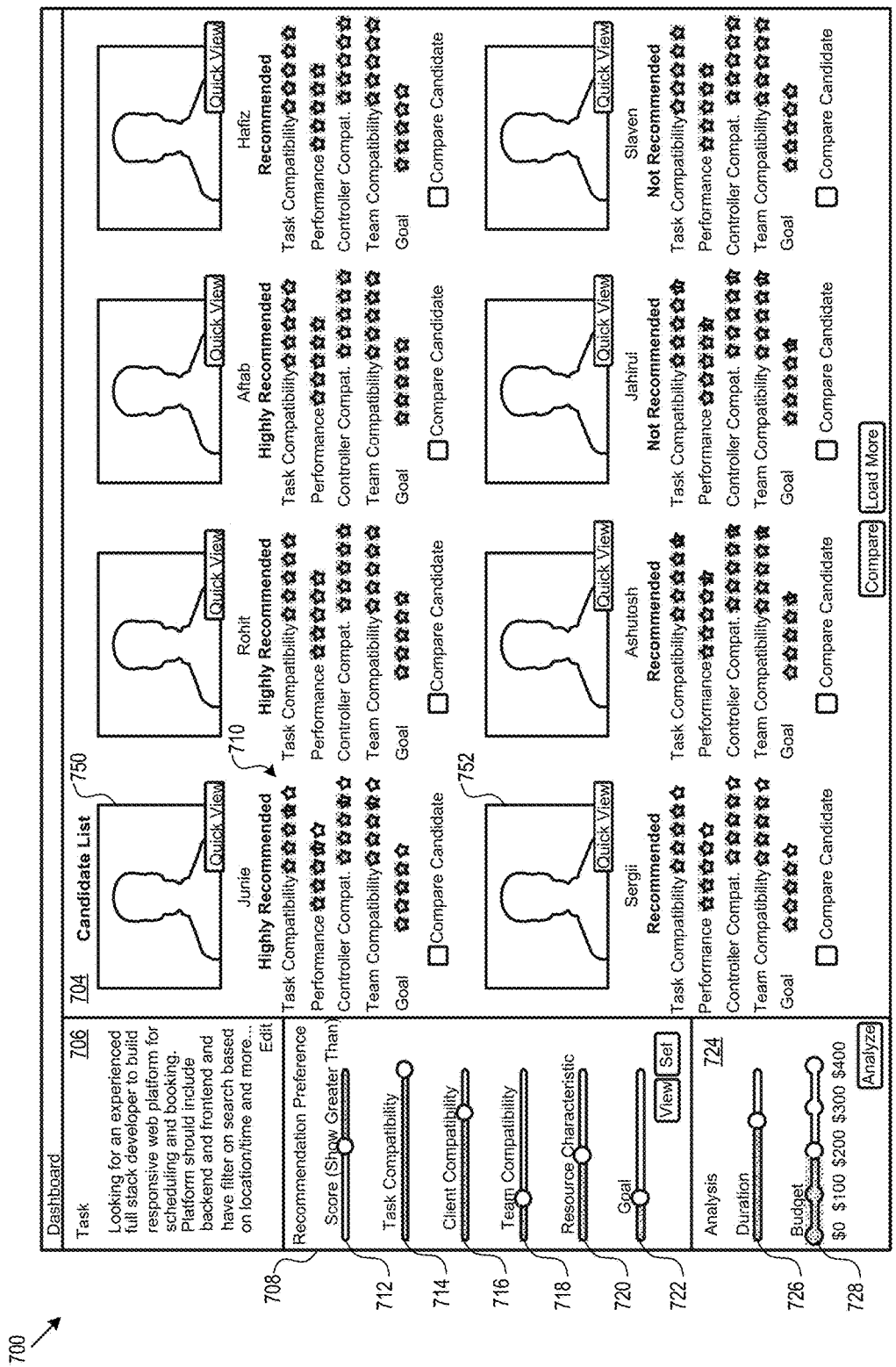
FIG. 7 shows an example potential resource interface.

FIG. 7 shows an example resource review interface 700. The resource review interface 700 shows a resource section 704, a task section 706, and a customization section 708. The resource section 704 shows potential resources for a task, e.g., the potential resources 750, 752, whose profile details were retrieved from, e.g., the sources 602, 604. The resource section 704 also provides an overview of specific analysis dimensions 710 applicable to each resource, e.g., the task compatibility dimension, resource characteristic (e.g., personal performance) dimension, task controller compatibility dimension, team compatibility dimension, and goal dimension. The task section 706 provides a description of the task that the task controller has posted. The customization section 708 provides preference inputs for adjusting the processing of the DRAM 112.

More specifically, the customization section 708 provides GUI elements that the operator may modify to adjust the DRAM 112 processing. In this example, the customization section 708 includes a score control 712, which eliminates from the display the resources falling below the score threshold; a task compatibility control 714, for setting an analysis weight for the task dimension 304; a task controller compatibility control 716, for setting an analysis weight for the controller dimension 306; a team compatibility control 718 for setting an analysis weight for the team dimension 308; a resource characteristic control 720, for setting an analysis weight for the resource dimension 302; and a goal control 722, for setting an analysis weight for the goal dimension 310. The analysis weights may be pre-determined or have default values, and the operator may adjust the analysis weights for any particular task.

The customization section 708 also includes an analysis section 724. In the analysis section 724, a duration control 726 allows the operator to specify task duration. In addition, a budget control 728 allows the operator to specify a task budget. The DRAM 112 evaluates these factors and others when assessing resource availability and cost.

FIGS. 8-16 show additional examples of the machine interfaces 210 that the DRAM 112 may generate. The machine interfaces 210 facilitate improved interaction with the DRAM 112, including more efficient understanding and review of each resource and the evaluation of each resource. The machine interfaces 210 may vary widely, and any particular implementation may include additional, fewer, and different interfaces.

Figure 8:
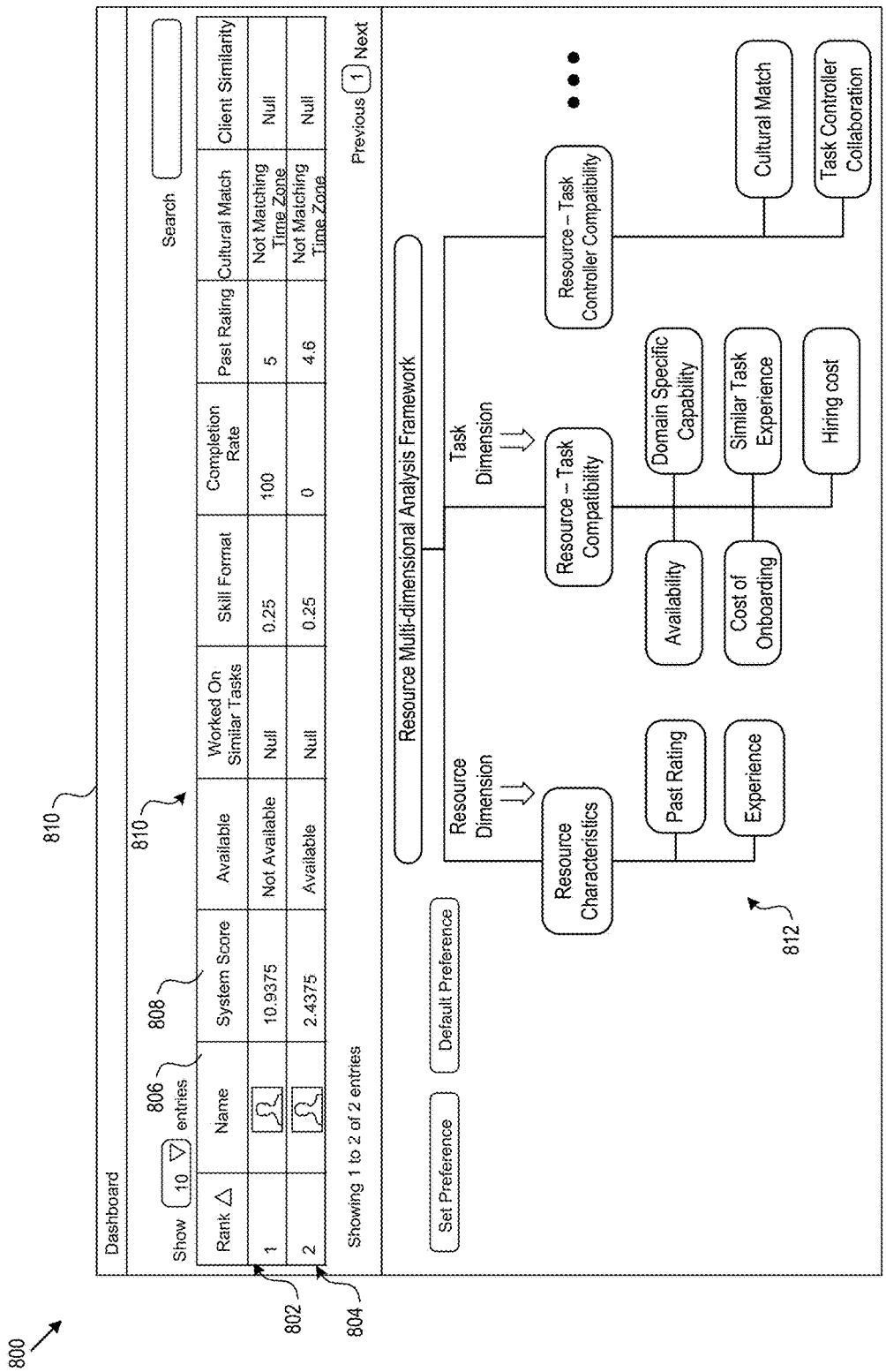
FIG. 8 shows an example resource analysis result interface.

FIG. 8 shows an example resource analysis result interface 800. The resource analysis result interface 800 displays result rows (e.g., rows 802, 804). Each result row may include a resource identifier 806; overall analysis result 808, e.g., a numerical score determined responsive to the weights set in the customization section 708; and dimensional analysis results 810. The dimensional analysis results 810 may include any specific results the DRAM 112 has determined along any dimension or dimensional characteristic. Examples in FIG. 8 include: whether the resource is available, task compatibility, the skill fitment of the resource to the task, the completion percentage of prior tasks taken by the resource, prior rating, cultural similarity, and task controller compatibility. A framework visualization section 812 provides a visualization of the particular multi-dimensional assessment framework 236 that the DRAM 112 is analyzing for the resources.

FIG. 9 shows an example resource detail interface 900. The resource detail interface 900 includes a resource details section 902, and a categorized details section 904. The resource details section 902, in this example, includes a profile summary section 906, a derived metrics section 908, as well as profile visualizations, e.g., the visualizations 910 and 912. The resource details section 902 may include profile text, educational highlights, career highlights, or other details.

The categorized details section 904 may provide a categorized tabbed display of resource profile details that lead to, e.g., derived metrics as well as resource data received from the sources 102-106. That resource data may include profile summary data, displayed in the profile summary section 906. The derived metrics section 908 may display selected metrics that the DRAM 112 has derived starting from the resource data obtained from the data platforms 102-108. Examples of derived data include the determinations of metrics along the multi-dimensional framework, such as overall score, ranking, task similarity score, task controller similarity score, and the like. The resource detail interface 900 may include any number or type of visualizations 910 and 912 to provide, e.g., a graphical interpretation of resource characteristics.

Figure 10:
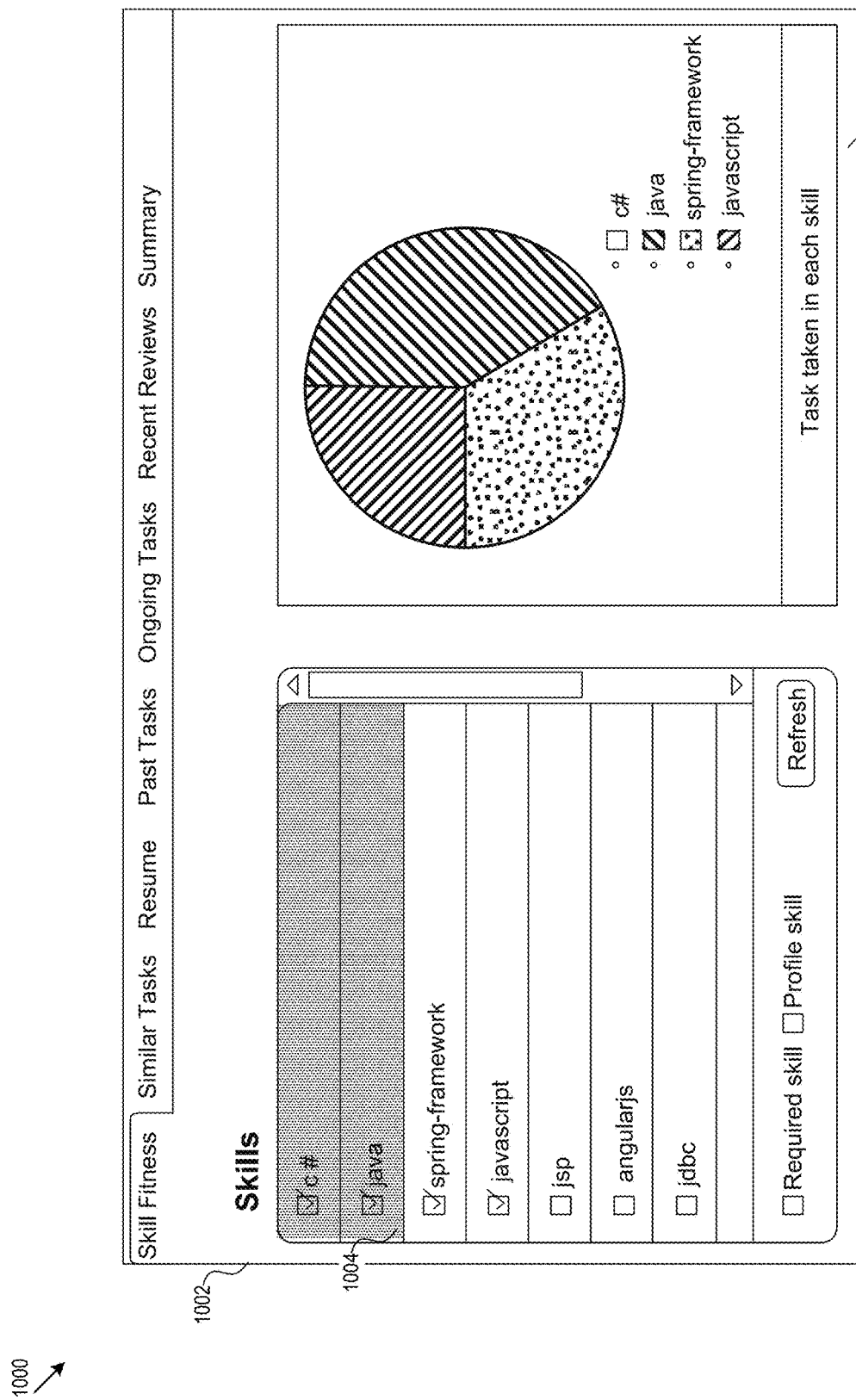
FIG. 10 shows additional detail from the resource detail interface.

FIG. 10 shows additional detail 1000 from the resource detail interface 900. In this example, the skill section 1002 shows the resource skills that match to the skills required by the task controller in the task that the task controller posted. The skill section 1002 shows those matching skills with a match indicator, in this case highlighting. The skill section 1002 renders skill selectors, such as check boxes 1004, to allow the operator to make selections of skills. The visualization 910 provides a graphical representation of the tasks taken by the resource under each of the selected skills.

FIG. 11 shows additional detail from the resource detail interface 900 in the form of an example similar task analysis interface 1100. The similar task analysis interface 1100 includes a similar task section 1102. The interface 1100 provides, in the similar task section 1102, narratives, skills, dates, feedback, comments, and other details concerning tasks that the DRAM 112 has identified as similar to the posted task and performed by the resource under evaluation.

Figure 12:
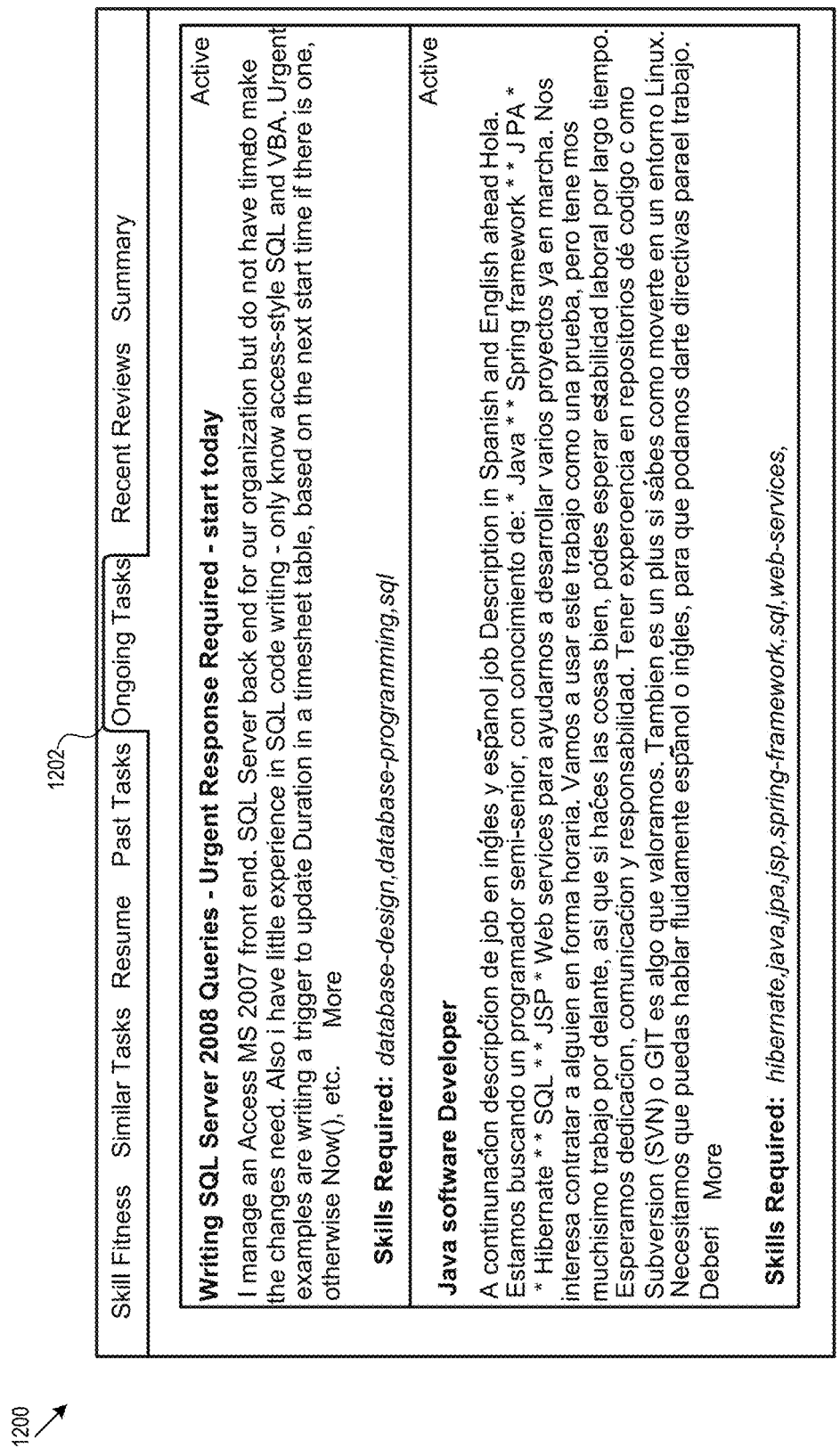
FIG. 12 shows an example ongoing tasks analysis interface.

FIG. 12 shows additional detail from the resource detail interface 900 in the form of an example ongoing tasks analysis interface 1200. The interface 1200 includes an ongoing task section 1202. The interface 1200 provides, in the similar task section 1202, narratives concerning ongoing tasks handled by the resource, including required skills and other ongoing task descriptors.

Figure 13:
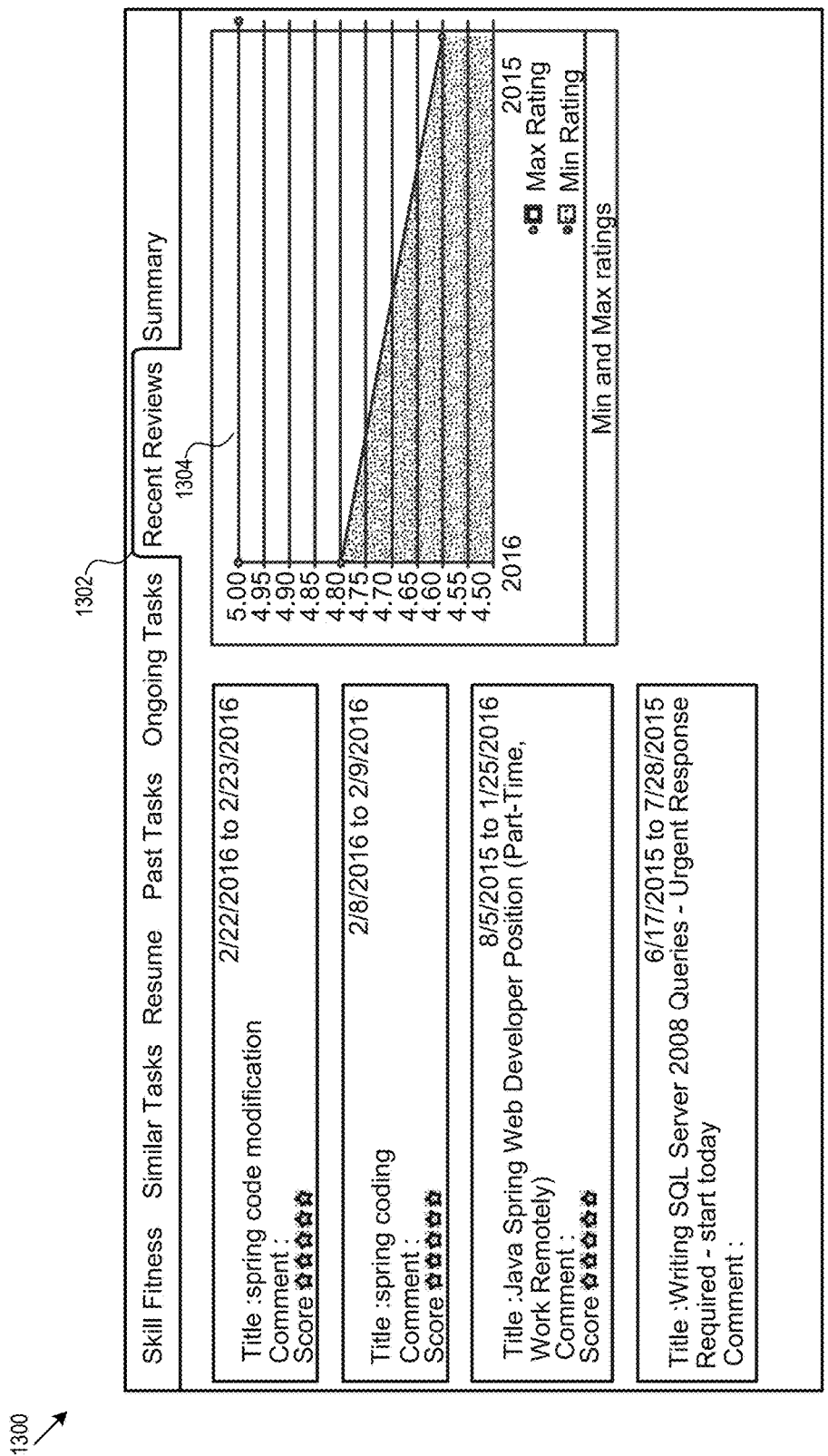
FIG. 13 shows an example recent reviews analysis interface.

FIG. 13 shows additional detail from the resource detail interface 900 in the form of an example recent reviews analysis interface 1300. The interface 1300 includes a recent reviews section 1302. The interface 1300 provides, in the recent reviews section 1302, details concerning evaluations of recent tasks taken by the resource. The evaluations may include details such as task title, review comments, scores or ratings, inception and completion dates, and the like. The interface 1300 may also include visualizations of review data, such as the time history min/max rating visualization 1304.

FIG. 14 shows additional detail from the resource detail interface 900 in the form of an example prior task analysis interface 1400. The interface 1400 includes a past tasks section 1402. The interface 1400 provides, in the past tasks section 1402, details concerning tasks previously performed by the resource. The past task details may include, as just a few examples, narratives describing the past task, dates worked, and skills required, learned, or improved.

Figure 15:
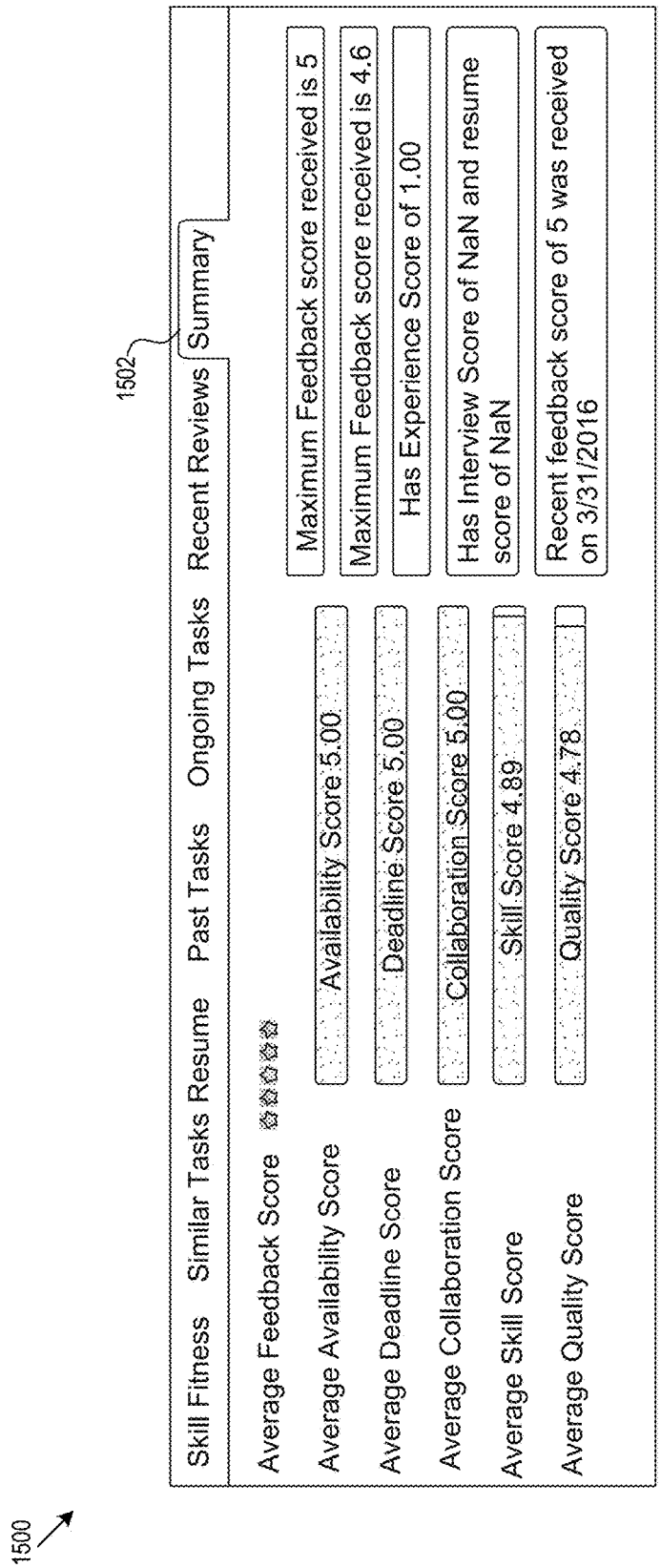
FIG. 15 shows an example summary analysis interface.

FIG. 15 shows additional detail from the resource detail interface 900 in the form of an example summary analysis interface 1500. The interface 1500 includes a summary section 1502. The summary section 1502 may provide details on resource characteristics, including how well the resource matches to a particular new task along any dimensions or metrics. For instance, the summary section 1502 may include feedback scores, availability scores, deadline scores, collaboration scores, skill scores, and quality scores. Other types of summary information may be provided, including applicable dates, minimum and maximum scores, averages, and the like.

Figure 16:
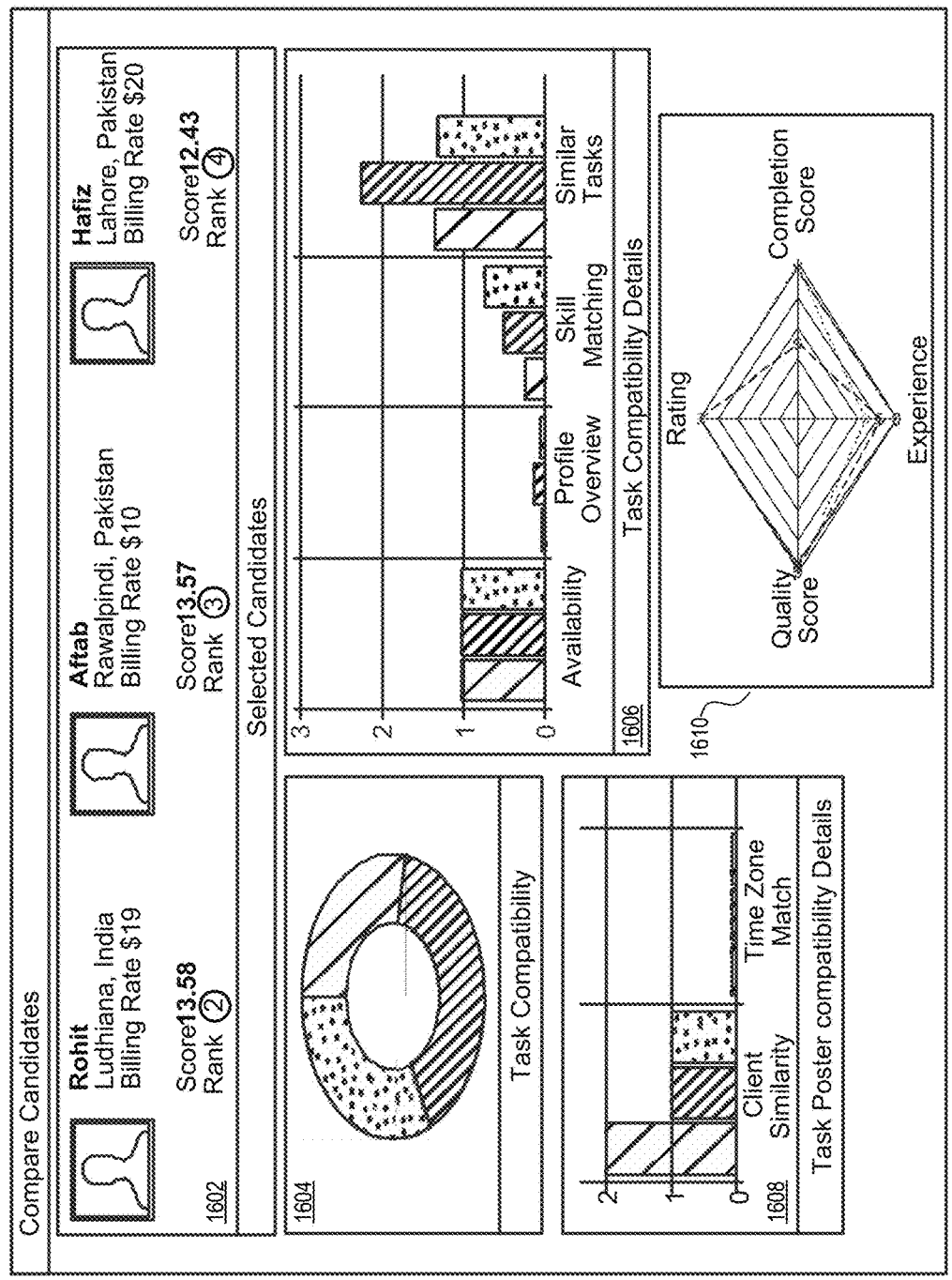
FIG. 16 shows an example resource comparison interface.

FIG. 16 shows an example resource comparison interface 1600. A resource identification section 1602 identifies each resource being compared. The interface 1600 renders any number or type of displays (e.g., the visualizations 1604,

1606, 1608, 1610) that provide a side-by-side comparison of each resource along any specific selected dimension or metric within a dimension.

Figure 17:
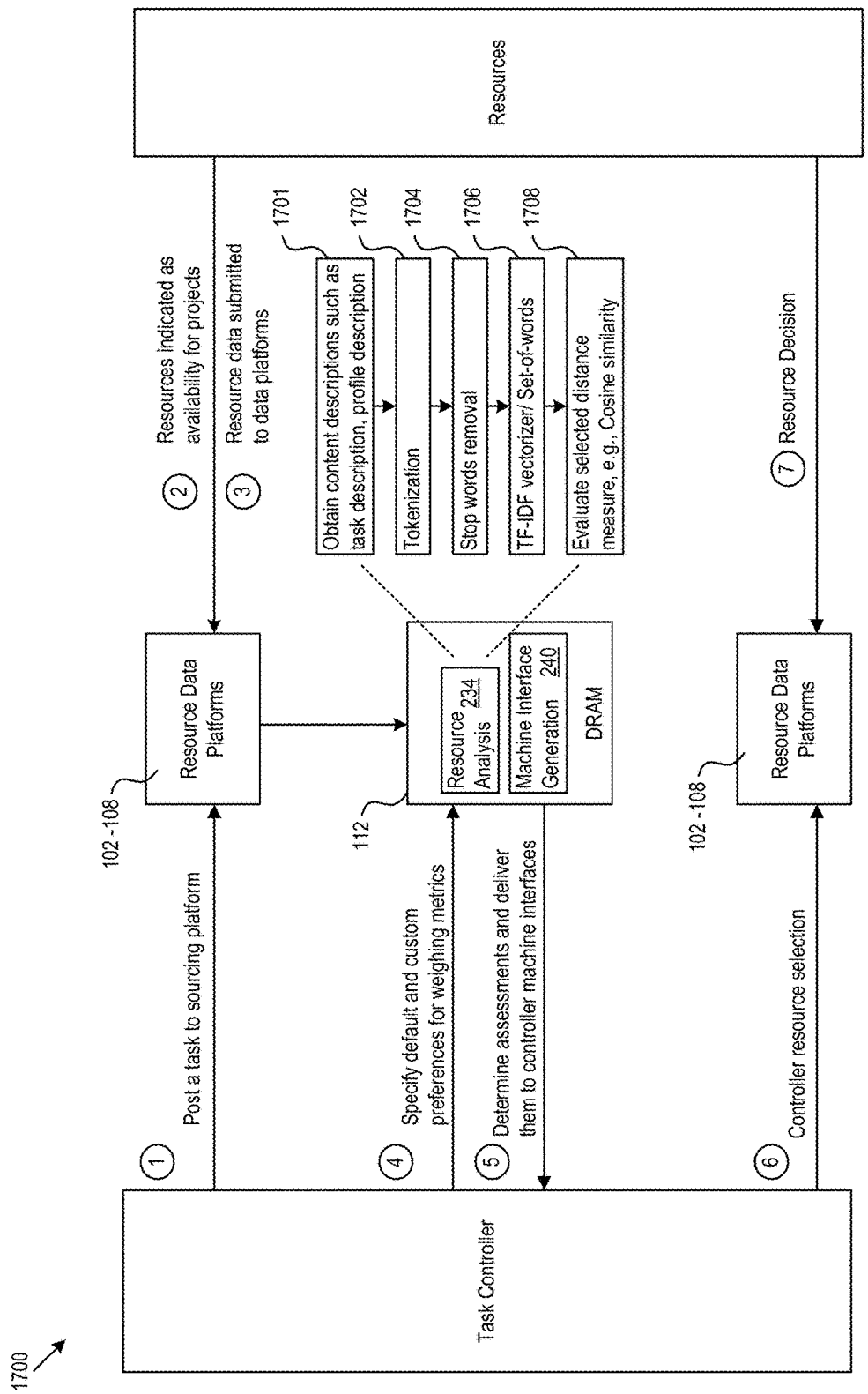
FIG. 17 shows an example of process flow for resource analysis.

FIG. 17 shows an example of process flow 1700 for resource analysis. In this example, the task controller posts a task description to a sourcing platform (e.g., one of the data platforms 102-108) (1). The task description includes data characterizing the task, as examples: a text narrative describing the task, required skills, optional skills, skill that will be learned, skill levels required, compensation, start date, end date, location, and team composition characteristics. Resources indicate their availability for tasks, e.g., by transmitting availability notifications to any one or more of the data platforms 102-108 (2). Any source of resource data, including the resource itself, may provide data characterizing the resources to any one or more of the data platforms 102-108 (3). The resource characteristics may include, as examples: skills known, skill levels, skill evaluation scores, experience (e.g., prior task descriptions), resource location, prior task locations, resource goals, availability, education, prior ratings, and cultural characteristics.

The task controller may set weighting preferences for the DRAM 112 to use in determining assessments (4). The weighting preferences may include default weights to use unless changed for a particular assessment. That is, the task controller may also set specific weighting preferences for the DRAM 112 to apply for any given assessment.

The DRAM 112 executes the assessment on the resources with respect to the posted task, and delivers the assessments to the task controller via the machine interfaces 210 (5). In response, the task controller may review and consider the resource assessments, interacting with the machine interfaces to do so. The task controller may then make resource selections for the task (6), and transmit the resource selections to the data platforms 102-108. If the resource will take on the task, then the resource may indicate acceptance of the task to the data platforms 102-108 (7).

The DRAM 112 may execute information retrieval and text mining operations, as examples, to match resources to tasks and determine the assessments. The DRAM 112 may apply these techniques when analyzing, e.g., text narratives of task descriptions and resource descriptions to find matching characteristics. FIG. 17 shows some examples of processing that the DRAM 112 may perform. For instance, the DRAM 112 may obtain content descriptions such as task descriptions and resource profile narratives (1701), and tokenize the descriptions (1702). The DRAM 112 optionally performs stop word removed (1704), e.g., to eliminate words present on a pre-defined stop word list that have little or no value in matching resource characteristics to task characteristics. The DRAM 112 may also execute term frequency-inverse document frequency (TF-IDF) as part of ascertaining how important a word is within the content descriptions (1706). To measure similarity, the DRAM 112 employs any desired distance measure between two documents 'a' and 'b' represented in vector space, such as the Cosine similarity measure (1708):

$$\vec{a} \cdot \vec{b} = \|\vec{a}\|\|\vec{b}\| \cos \theta$$

$$\cos \theta = \frac{\vec{a} \cdot \vec{b}}{\|\vec{a}\|\|\vec{b}\|}$$

Figure 18:
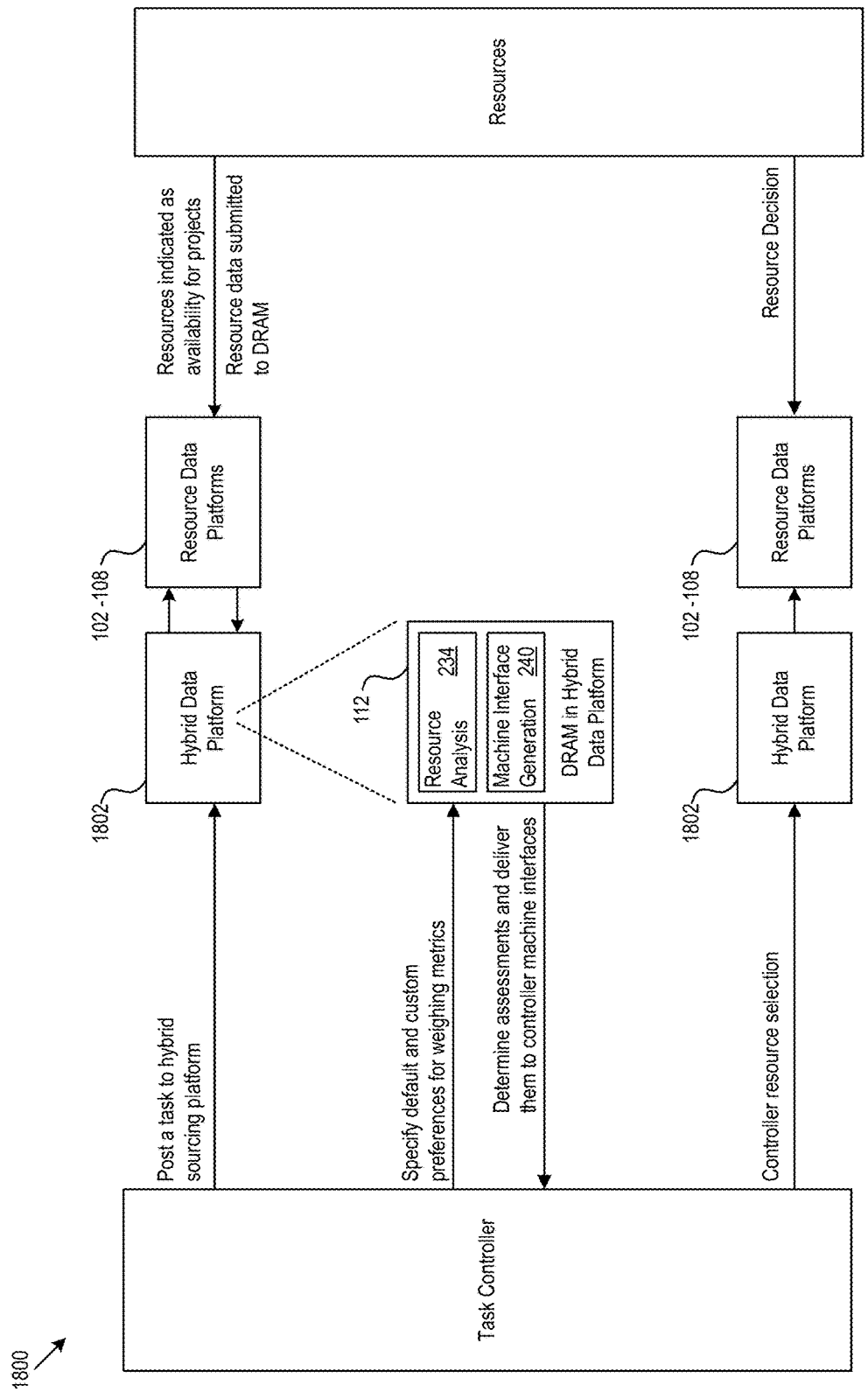
FIG. 18 shows another example of process flow for resource analysis when integrated with a hybrid sourcing platform.

FIG. 18 shows another example of process flow 1800 for resource analysis when integrated with a hybrid sourcing platform. FIG. 18 extends the example of FIG. 17. In FIG. 18, an intermediate, hybrid resource data platform 1802 is implemented between the task controller and the external data platforms 102-108. The hybrid resource data platform 1802 may represent, for instance, a private company internal system that initially receives task postings for review and consideration by company personnel. The hybrid resource data platform 1802 may determine when and whether to pass the task postings to the external data platforms 102-108, e.g., when the company desires to extend the resource search outside of the company. In that regard, the hybrid resource data platform 1802 receives resource characteristics from the external data platforms 102-108.

In the example shown in FIG. 18, the DRAM 112 is implemented as part of the hybrid resource data platform 1802. The hybrid resource data platform 1802 executes the DRAM functionality to determine and report resource assessments to the task controller. Selections of resources (or offers made to resources) for the task flow first to the hybrid resource data platform 1802, and possibly to the external data platforms 102-108, e.g., when resources external to the company have been selected or offered a task.

Further Examples

Many variations of the DRAM implementation are possible. The DRAM 112 may include modules for determining similarity between tasks based on the task features such as task type, duration, skills required, and so on. The DRAM 112 may also include modules for computing similarity between task controllers. The similarity computation modules are used for recommending resources for tasks. The DRAM 112 may also include modules for sentiment analysis of the textual feedback given by the task controller for the resources. The sentiment analysis identifies, e.g., whether the task controller is satisfied with the completed task. It takes as input the textual feedback and outputs sentiment details. Some examples of sentiments are: positive, negative, and neutral. Furthermore, the sentiment analysis module may categorize the textual feedback based on any number of pre-defined aspects, such as Skill, Quality, Communication, Collaboration, Deadline and Availability based on the defined rules. Note that the DRAM 112 may determine metrics pertaining to any pre-defined set of dimensions, e.g., as show in FIGS. 3-5.

Combined Assessment Score

In some implementations, the DRAM 112 determines a combined assessment score for the resource under assessment. In that respect, the DRAM 112 may implement a machine learning module trained to learn the weightings of each metric to arrive at the final assessment score for each resource, as just one example. Expressed another way, the DRAM 112 optionally combines determined metrics to arrive at a final assessment score for each resource. Each metric may be given a weight to arrive at the final score. For example, the equation below combines Availability, Skill Fitness, and Task Similarity metrics to arrive at a final score for a task dimension 304 according to the dimensional component weights $dcw_1$, $dcw_2$, $dcw_3$, and $dcw_4$:

FinalScore=$dcw_1$*Availability+$dcw_2$*SkillFit+ $dcw_3$*Experience+$dcw_4$*Profile;

More generally, the DRAM 112 may assess a resource by combining any selected dimensions using pre-determined dimensional weights to arrive at a final assessment score, across any number of included dimensions, e.g., for the framework 300:

ResourceScore=$dw_1$*ResourceDimension+$dw_2$*TaskDimension+$dw_3$*ControllerDimension+$dw_4$*TeamDimension+$dw_5$*GoalDimension;

The DRAM 112 may determine or select weights (including setting default weights) using from the machine learning algorithms or linear or logistic regression techniques. As one example, the DRAM 112 may optimize using the following equation with a specific optimization objective:

$$Y=w_0+w_1f_1+f_2f_2+\ldots+w_nf_n$$

in which $w_i$—represent weights, $f_i$—dimension/metric score, Y—observed value, e.g., selected or not selected for the task.

The machine learning module in the DRAM 112 may, for instance, learn the importance of each metric from the historical data about tasks and resources. The DRAM 112 may employ an online learning algorithm and the weights may be refined with each new data sample.

An example machine learning implementation follows:

Input: Set of tasks and assessment metrics for all the resources who worked/applied on those tasks.

Output: Weights/importance of each metric that models a successful resource selection behavior.

Execution

Step 1: Prepare the training data as follows:

For each task that has more than one potential resource, create a data point for each resource with the following attributes:

a) all the evaluation metrics for the resource, task, and task controller b) indication of whether the resource was hired for the task.

Step 2: Apply a machine learning algorithm on the training data.

Step 3: Returns the weights identified by the algorithm.

Customizing Assessment Model

The DRAM 112 also accepts and responds to modifications of the weights supplied by, e.g., task controllers. For instance, a task controller may prefer to select a resource that he has worked with in past and with which he had a good past experience. Hence, the DRAM 112 allows the task controller to override the default weightings to express these preferences.

What-if Analysis

The DRAM 112 may perform what-if analyses to help assess resources if, e.g., the pre-defined scores and metrics are not sufficient to make a selection decision. In one implementation, the DRAM 112 predicts the likelihood of task completion and the quality of the completed task if done by a particular resource. The DRAM 112 may execute the analysis on the historical data about tasks and resources, using a machine learning module which trains models for task completion and task quality. The trained model may predict task completion and the quality of the completed task.

The what-if analyses allow the task controller to vary, e.g., the duration and budget for the task to see anticipated outcomes. The task controller may then use the anticipated outcomes to negotiate (if applicable) with the resources to reach agreement on a set of task characteristics (e.g., duration and budget) that achieve a beneficial outcome. The DRAM 112 responds by assessing and displaying the task completion probability and quality of completed task for all the applicants. The DRAM 112 may estimate and report task completion probability assuming any given resource is assigned to a task. For any or all of the potential resources, the DRAM 112 may determine this probability. The system operator, through an operator GUI, can vary the task duration, budget, skills, and system displays the revised task completion probability for each resource based on a machine learning model trained from the past data. The DRAM 112 may also predicts the quality of a completed task. The system operator, through an operator GUI, can vary the task duration, budget, and skills. The DRAM 112 responds by determining the quality of the completed task for each resource by executing, e.g., a machine learning model trained on the prior data.

Evaluating New Resources

Note that the DRAM 112 may obtain and analyze information available from other sources than the data platforms 102-108 in its assessments. Examples of additional information include resource public profiles on professional networks, publically available references, and descriptions and feedback on tasks done during their academic training or in an industry.

Assessment as a Service

A local or cloud based hosting platform may offer the DRAM 112 as a service subscribed to or paid for by any third party platform.

Table 7 below provides further examples of metrics the DRAM 112 may assess in any particular implementation, including examples of how the DRAM 112 may derive metrics starting with certain data.

TABLE 7

Example metrics for assessing resources

| Metric | Description | How to Assess |
|---|---|---|
| Availability | whether or not the resource is available for the given duration | Available working hours/day for a resource id determined based on number of tasks the resource is doing and estimated completion time for each task. For example, suppose resource is working on two tasks that need to be completed in 20 days and estimated to take 40 hours. So on an average, the resource spends 2 hours on each task. Thus the remaining time available is (8 − (2 + 2) = 4 hours). |
| Skill Fitness | Matching score between the required skill and resources skills | % skill matched: Number of skills that are required by the posted task and also possessed by the resource/Total number of skills required by the task. |
| Rating | How the resource has been rated in past. | Average Rating: Average resource rating as given by others in past. |

TABLE 7-continued

Example metrics for assessing resources

| Metric | Description | How to Assess |
| --- | --- | --- |
| Goals | What goals the resource has specified for itself in information available in the resource profile. | Task-goal match: Percentage skills that are required by the tasks and also aspired as 'must have skills' by the resource/Total number of skills required by the task |
| Task Controller Collaboration | How well the resource has collaborated with the task controller in the past | Task completion rate for the task controller: 100* Total tasks completed by the resource for the task controller/Total tasks completed by the resource in past |
| | Sentiment | Perform sentiment analysis on the written comments for the resource to score it on aspects such as: 'motivated', 'works well with others', 'follows well', 'timeliness'. |
| | How well he has collaborated with similar task controllers in the past | Tasks completion rate for similar task controllers: 100* Total number of tasks completed by the resource for similar task controllers/Total tasks completed successfully. Similarity score may be defined based on geography, total tasks posted, total tasks completed, and other factors. |
| Cultural/ Geographical | Overlapping workhour | Overlapping work hours: number of overlapping work hours for the resource and the task controller. |
| | Is there a restriction on geography to choose a resource. | Geographical match: Boolean value whether resource geography is matched with task controller specified requirement |
| Cost of hiring - fixed time | How much the resource is likely to charge for the task. | Cost of similar task: how much resource has quoted in past for similar tasks. |
| Cost of hiring - hourly | How much resource charges per hour | Hourly rate: charge rate for the resource |
| Similar task experience | How many similar tasks he has performed in the past and what were the scores for those tasks. | Similar task performance: 100* Number of similar tasks performed by the resource in past/Total number of tasks performed by the resource in past. Similarity is defined based on some task attributes. |
| Task completion | How many tasks resource has successfully completed. | Task completion rate: 100* Number of tasks successfully completed/Total number of tasks undertaken |
| Resource score | Average score | Averages score: Average of all the scores given to the resource on a select set of (e.g., all) prior tasks. |
| | Max score | Max score: Maximum score resource has obtained so far. |
| | Min score | Min score: Minimum score the resource has obtained so far. |
| | Recency of max score | Recency of max score: Date when resource has scored the maximum score. |
| | Average recent score. | Average rating of the resource for last one year. |
| Resume score | Educational background | Rating based on educational degrees. |
| | Diversity of experience | Number of skills resource has experience. |
| | Awards and recognition | Score based on awards and recognition. |
| Cost of onboarding | This may include cost of training, knowledge transfer, etc. for onboarding a crowd resource. | This metric may assess skill gaps, domain knowledge, and prior experience of the resource. |
| Team collaboration | To capture how well the crowd resource fits with other team member | % tasks worked with team member in past: percentage of tasks the crowd resource has worked with any of the team member in the past. |
| Time zone compatibility | How well the time zone matches with other team resources. | Time zone gap: min, max, and average of time zone difference with rest of the team members. |

Determining Text Similarity

In order to find the similarity between text features such as task title, task description, resource profile overview and resource experience details, the DRAM 112 may implement a TF-IDF approach:

$$\text{TF-IDF weight} = (1 + \log(\text{term\_frequency})) \cdot \log(N/\text{Document\_frequency})$$

In the TF-IDF approach, 'term frequency' represents the number of times a search term, such as a word in a task title or task description, appears in a document, such as a resource description. In this particular example, the approach uses a log-scaled metric, 1+log(term_frequency), for frequency, although other frequency metrics may be used. Note that the TF-IDF approach includes a term frequency-inverse adjustment, log (N/document_frequency). This adjustment reduces the weight score in log relation to the number of documents in a pre-defined collection of N documents that include the search term. As a result, common terms used in all documents (e.g., "the", "an") provide little weight (because log(1) is 0) and are effectively filtered out in the TF-IDF calculation.

The methods, devices, processing, frameworks, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and controlled, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A system comprising:
a communication interface;
a memory comprising:
 a multi-dimensional assessment framework comprising:
  assessment dimensions comprising at least a resource dimension, a task dimension, a task controller dimension, a goal dimension, and a team dimension configured to evaluate resource-to-team compatibility, the team dimension defining: a team collaboration metric and a timezone match metric; and
  dimensional metrics assigned to the assessment dimensions; and
  dimensional weights for the assessment dimensions;
resource analysis circuitry configured to:
 obtain task characteristics specified by a task controller for a posted task;
 connect to a resource data platform through the communication interface;
 obtain resource characteristics from the resource data platform that characterize an available resource that may be selected for the posted task; and
 determine a resource assessment for the available resource according to:
  the assessment dimensions and dimensional metrics in the multi-dimensional assessment framework; and
  the dimensional weights; and
machine interface generation circuitry configured to:
 generate a machine interface comprising a visualization of the resource assessment;
 deliver the machine interface to the task controller through the communication interface;
 generate a task completion graphical user interface (GUI) comprising: a task completion probability of the posted task by the available resource, and a task characteristic control that changes at least one task characteristic of the posted task;
 receive adjustment inputs to the task characteristic control that changes at least one task characteristic of the posted task; and
 generate an updated task completion GUI comprising a revised completion probability of the posted task by the available resource according to the adjustment inputs.

2. The system of claim 1, where:
the machine interface generation circuitry is further configured to:
 generate a customization graphical user interface comprising a preference control that changes at least one of the dimensional weights.

3. The system of claim 1, further comprising:
a hybrid data platform that hosts the resources analysis circuitry and the posted task internal to a pre-defined organization; and
where the resource analysis circuitry is further configured to:
determine whether to transmit the posted task to an external data platform outside of the pre-defined organization.

4. The system of claim 3, where:
the resource data platform is internal to the pre-defined organization.

5. The system of claim 4, where:
the resource data platform is external to the pre-defined organization; and
the resource analysis circuitry is further configured to:
obtain at least some of the resource characteristics from the resource data platform after transmitting the posted task to the external data platform.

6. The system of claim 1, where:
the team collaboration metric comprises:

$$\text{Team\_Collaboration}(w, \text{team}) = \frac{1}{n} \sum_{i=1}^{n} \left( \frac{\sum_{j=1}^{n} \text{Rating}_{ij}}{N} \right)$$

where n is the total number of resources that part of a team, N is the total number of tasks in which resource w has collaborated with $w_i$ ($w_i \in \text{team}$) and $\text{Rating}_{ij}$ is a feedback score received by resource w in collaboration with $w_i$ on task tj;
the task controller collaboration metric comprises:

$$\text{Collaboration\_Score}(tp, cw) = \frac{\sum_{i=1}^{N} \text{Rating}_i}{N}$$

where N is a total number of tasks for which cw has collaborated with tp and Rating, is a feedback score given to cw by tp upon task completion;
the cultural match metric comprises:

$$\text{Cultural\_Match}(C_{tp}, C_w) = \frac{C_{tp} \cap C_w}{C_{tp} \cup C_w}$$

where $C_{tp}$ represents a task controller of one country in collaboration with a resource from another country $C_w$; and
the skill fitness metric comprises:

$$\text{Skill\_Fitness}(S_t, S_w) = \frac{\text{Match}(S_t, S_w)}{|S_t|} + \sum_{\forall S_t} T_s * T_p$$

where $S_t$ is a set of skills required for a task, $S_w$ is a set of skills possessed by the resource, $T_s$ is a Test score and $T_p$ is a Test percentile, and $\text{Match}(S_t, S_w)$ computes a number of matched skills between $S_t$ and $S_w$ and $|S_t|$ is a total number of skills required by the task.

7. A method comprising:
establishing in memory:
a multi-dimensional assessment framework comprising:
assessment dimensions comprising at least a resource dimension, a task dimension, a task controller dimension, a goal dimension, and a team dimension configured to evaluate resource-to-team compatibility, the team dimension defining:
a team collaboration metric and a timezone match metric; and
dimensional metrics assigned to the assessment dimensions; and
dimensional weights for the assessment dimensions;
executing resource analysis circuitry to:
obtain task characteristics specified by a task controller for a posted task;
connect to a resource data platform through a communication interface;
obtain resource characteristics from the resource data platform that characterize an available resource that may be selected for the posted task; and
determine a resource assessment for the available resource according to:
the assessment dimensions and dimensional metrics in the multi-dimensional assessment framework; and
the dimensional weights; and
executing machine interface generation circuitry to:
generate a machine interface comprising a visualization of the resource assessment;
deliver the machine interface to the task controller through the communication interface;
generate a task completion graphical user interface (GUI) comprising: a task completion probability of the posted task by the available resource, and a task characteristic control that changes at least one task characteristic of the posted task;
receive adjustment inputs to the task characteristic control that changes at least one task characteristic of the posted task; and
generate an updated task completion GUI comprising a revised completion probability of the posted task by the available resource according to the adjustment inputs.

8. The method of claim 7, further comprising:
generating a customization graphical user interface comprising a preference control that changes at least one of the dimensional weights.

9. The method of claim 7, further comprising:
hosting, in a hybrid data platform internal to a pre-defined organization, the resources analysis circuitry and the posted task; and
determining whether to transmit the posted task to an external data platform outside of the pre-defined organization.

10. The method of claim 9, where:
the resource data platform is internal to the pre-defined organization.

11. The method of claim 10, where:
the resource data platform is external to the pre-defined organization; and further comprising:
obtaining at least some of the resource characteristics from the resource data platform after transmitting the posted task to the external data platform.

12. The method of claim 7, where:
the team collaboration metric comprises:

$$\text{Team\_Collaboration}(w, \text{team}) = \frac{1}{n} \sum_{i=1}^{n} \left( \frac{\sum_{j=1}^{n} \text{Rating}_{ij}}{N} \right)$$

where n is the total number of resources that part of a team, N is the total number of tasks in which resource w has collaborated with $w_i$ ($w_i \in$ team) and $\text{Rating}_{ij}$ is a feedback score received by resource w in collaboration with $w_i$ on task tj;
the task controller collaboration metric comprises:

$$\text{Collaboration\_Score}(tp, cw) = \frac{\sum_{i=1}^{N} \text{Rating}_i}{N}$$

where N is a total number of tasks for which cw has collaborated with tp and Rating, is a feedback score given to cw by tp upon task completion;
the cultural match metric comprises:

$$\text{Cultural\_Match}(C_{tp}, C_w) = \frac{C_{tp} \cap C_w}{C_{tp} \cup C_w}$$

where $C_{tp}$ represents a task controller of one country in collaboration with a resource from another country $C_w$; and
the skill fitness metric comprises:

$$\text{Skill\_Fitness}(S_t, S_w) = \frac{\text{Match}(S_t, S_w)}{|S_t|} + \sum_{\forall S_t} T_s * T_p$$

where $S_t$ is a set of skills required for a task, $S_w$ is a set of skills possessed by the resource, $T_s$ is a Test score and $T_p$ is a Test percentile, and Match ($S_t$, $S_w$) computes a number of matched skills between $S_t$ and $S_w$ and $|S_t|$ is a total number of skills required by the task.

13. A system comprising:
a communication interface;
a memory comprising:
   a multi-dimensional assessment framework comprising assessment dimensions and dimensional metrics including:
     a resource dimension configured to evaluate resource specific characteristics, the resource dimension defining:
      a past rating metric; and
      an experience metric;
     a task dimension configured to evaluate resource-to-task compatibility, the task dimension defining:
      an availability metric; and
      a skill fitness metric;
     a controller dimension configured to evaluate resource-to-task controller compatibility, the controller dimension defining:
      a cultural match metric; and
      a task controller collaboration metric;
     a team dimension configured to evaluate resource-to-team compatibility, the team dimension defining:
      a team collaboration metric; and
      a timezone match metric; and
     a goal dimension configured to evaluate resource goals, the goal dimension defining:
      a skill opportunity metric; and
   dimensional weights for the assessment dimensions, including:
     a resource dimensional weight for the resource dimension;
     a task dimensional weight for the task dimension;
     a controller dimensional weight for the controller dimension;
     a team dimensional weight for the team dimension; and
     a goal dimensional weight for the goal dimension;
resource analysis circuitry configured to:
   obtain task characteristics specified by a task controller for a posted task;
   connect to a resource data platform through the communication interface;
   obtain resource characteristics from the resource data platform that characterize an available resource that may be selected for the posted task; and
   determine a resource assessment for the available resource according to:
     the assessment dimensions and dimensional metrics in the multi-dimensional assessment framework; and
     the dimensional weights; and
machine interface generation circuitry configured to:
   generate machine interfaces comprising:
     a resource assessment result interface comprising assessment results for multiple of the available resources;
     a resource detail interface for a selected resource among the available resources, the resource detail interface comprising:
      a skill fitness section;
      a similar task analysis section;
      an ongoing tasks analysis section;
      a recent reviews analysis section;
      a prior task analysis section; and
      a summary analysis section;
     a resource comparison interface presenting a side-by-side comparison of the multiple available resources;
   deliver the machine interfaces to the task controller through the communication interface;
   generate a task completion graphical user interface (GUI) comprising: a task completion probability of the posted task by the available resource, and a task characteristic control that changes at least one task characteristic of the posted task;
   receive adjustment inputs to the task characteristic control that changes at least one task characteristic of the posted task; and
   generate an updated task completion GUI comprising a revised completion probability of the posted task by the available resource according to the adjustment inputs.

14. The system of claim 13, where:
the team collaboration metric comprises:

$$\text{Team\_Collaboration}(w, \text{team}) = \frac{1}{n}\sum_{i=1}^{n}\left(\frac{\sum_{j=1}^{n} Rating_{ij}}{N}\right)$$

where n is the total number of resources that part of a team, N is the total number of tasks in which resource w has collaborated with $w_i$ ($w_i \in$ team) and $Rating_{ij}$ is a feedback score received by resource w in collaboration with $w_i$ on task tj;
the task controller collaboration metric comprises:

$$\text{Collaboration\_Score}(tp, cw) = \frac{\sum_{i=1}^{N} Rating_i}{N}$$

where N is a total number of tasks for which cw has collaborated with tp and $Rating_i$ is a feedback score given to cw by tp upon task completion;
the cultural match metric comprises:

$$\text{Cultural\_Match}(C_{tp}, C_w) = \frac{C_{tp} \cap C_w}{C_{tp} \cup C_w}$$

where $C_{tp}$ represents a task controller of one country in collaboration with a resource from another country $C_w$; and
the skill fitness metric comprises:

$$\text{Skill\_Fitness}(S_t, S_w) = \frac{\text{Match}(S_t, S_w)}{|S_t|} + \sum_{\forall S_t} T_s * T_p$$

where $S_t$ is a set of skills required for a task, $S_w$ is a set of skills possessed by the resource, $T_s$ is a Test score and $T_p$ is a Test percentile, and Match $(S_t, S_w)$ computes a number of matched skills between $S_t$ and $S_w$ and $|S_t|$ is a total number of skills required by the task.

\* \* \* \* \*